(12) United States Patent
Huang et al.

(10) Patent No.: US 9,690,424 B2
(45) Date of Patent: Jun. 27, 2017

(54) IN-CELL MULTI-TOUCH DISPLAY PANEL SYSTEM

(71) Applicant: ORISE TECHNOLOGY CO., LTD., Hsinchu (TW)

(72) Inventors: Chien-Ying Huang, Hsinchu (TW); Yen-Lin Huang, Taipei (TW)

(73) Assignee: FOCALTECH SYSTEMS CO., LTD., Hsinchu (TW)

( * ) Notice: Subject to any disclaimer, the term of this patent is extended or adjusted under 35 U.S.C. 154(b) by 0 days.

(21) Appl. No.: 15/292,392

(22) Filed: Oct. 13, 2016

(65) Prior Publication Data

US 2017/0031507 A1  Feb. 2, 2017

Related U.S. Application Data

(63) Continuation of application No. 14/077,346, filed on Nov. 12, 2013.

(30) Foreign Application Priority Data

Nov. 14, 2012 (TW) .............................. 101142455 A

(51) Int. Cl.
| | |
|---|---|
| *G06F 3/041* | (2006.01) |
| *G06F 3/044* | (2006.01) |
| *G02F 1/1333* | (2006.01) |
| *G02F 1/1362* | (2006.01) |
| *G02F 1/1368* | (2006.01) |

(52) U.S. Cl.
CPC .......... *G06F 3/0416* (2013.01); *G02F 1/1368* (2013.01); *G02F 1/13338* (2013.01); *G02F 1/136286* (2013.01); *G06F 3/041* (2013.01); *G06F 3/044* (2013.01); *G06F 3/0412* (2013.01); *G06F 2203/04104* (2013.01)

(58) Field of Classification Search
None
See application file for complete search history.

(56) References Cited

U.S. PATENT DOCUMENTS

| | | | | |
|---|---|---|---|---|
| 2008/0062140 | A1* | 3/2008 | Hotelling | G09G 3/3648 345/173 |
| 2009/0135158 | A1* | 5/2009 | Takahashi | G06F 3/044 345/174 |

(Continued)

*Primary Examiner* — Nicholas Lee
*Assistant Examiner* — Duane N Taylor, Jr.
(74) *Attorney, Agent, or Firm* — Bacon & Thomas, PLLC

(57) ABSTRACT

An in-cell multi-touch display panel system includes a multi-touch LCD panel and a touch display control subsystem. The multi-touch LCD panel has a TFT layer, a detection electrode layer, and a common-voltage and touch-driving layer. The detection electrode layer has M first conductor lines for performing touch detection by sampling touch detection from the M first conductor lines. The common-voltage and touch-driving layer has N second conductor lines for receiving common voltage in display and touch-driving signal in touch detection. In the detection electrode layer, there are pluralities of detection electrode areas in the intersections of first conductor lines and second conductor lines. Each detection electrode area is connected to a first conductor line by a touch-control transistor. The M×N touch-control transistors are divided in to N sets corresponding to N second conductor lines, respectively.

20 Claims, 17 Drawing Sheets

(56) References Cited

U.S. PATENT DOCUMENTS

2010/0045635 A1* 2/2010 Soo .................... G06F 3/046
  345/178
2010/0194707 A1* 8/2010 Hotelling .............. G06F 3/0412
  345/173

* cited by examiner

IN-CELL MULTI-TOUCH DISPLAY PANEL SYSTEM

CROSS-REFERENCE TO RELATED APPLICATION

This application is a continuation of U.S. patent application Ser. No. 14/077,346, filed on Nov. 12, 2013, entitled "In-cell multi-touch display panel system", which is incorporated herein by reference.

BACKGROUND OF THE INVENTION

1. Field of the Invention

The present invention relates to the technical field of touch panels and, more particularly, to an in-cell multi-touch display panel system.

2. Description of Related Art

The principle of touch panels is based on different sensing manners to detect a voltage, current, acoustic wave, or infrared to thereby detect the coordinate of a touch point on a screen as touched by a finger or other medium. For example, a resistive touch panel uses a potential difference between the upper and lower electrodes to compute the position of a pressed point for detecting the location of the touch point, and a capacitive touch panel uses a capacitance change generated in an electrostatic combination of the arranged transparent electrodes with the touching part of a human body to generate a current or voltage for detecting the coordinate of the touching part.

Upon the principle, the capacitive touch technologies can be divided into a surface capacitive and a projected capacitive sensing. The surface capacitive sensing has a simple configuration, so that the multi-touch implementation is not easy, and the problems of electromagnetic disturbance (EMI) and noises are difficult to be overcome. Therefore, the popular trend of capacitive touch development is toward the projected capacitive sensing.

The projected capacitive sensing can be divided into a self capacitance and a mutual capacitance sensing. The self capacitance sensing indicates that a capacitance coupling is generated between a touch object and a conductor line, and a touch occurrence is decided by measuring a capacitance change of the conductor line. The mutual capacitance sensing indicates that a capacitance coupling is generated between two adjacent conductor lines when a touch occurs.

A typical self capacitance sensing senses the grounded capacitance (Cs) on every conductor line. Thus, a change of the grounded capacitance is used to determine whether an object is close the capacitive touch panel.

The self capacitance or the grounded capacitance is not a physical capacitor, but parasitic and stray capacitance on every conductor line. FIG. 1 is a schematic view of a typical self capacitance sensing. As shown in FIG. 1, during the first time interval, the driving and sensing devices 110 in a first direction drive the conductor lines in the first direction in order to further charge the self capacitance (Cs) of the conductor lines in the first direction. During the second period, the driving and sensing devices 110 sense the voltages on the conductor lines in the first direction, thereby obtaining in data. During the third period, the driving and sensing devices 120 in a second direction drive the conductor lines in the second direction in order to further charge the self capacitance of the conductor lines in the second direction. During the fourth period, the driving and sensing devices 120 sense the voltages on the conductor lines in the second direction, thereby obtaining n data. Accordingly, there are m+n data obtained.

The typical self capacitance sensing of FIG. 1 connects both a driver circuit and a sensor circuit on the same conductor line in order to drive the conductor line and sense a signal change on the same conductor line to thereby decide a magnitude of the self capacitance. In this case, the advantages include:

(1) a reduced amount of data since the typical touch panel has m+n data in a single image only, so as to save the hardware cost;

(2) a reduced time required for sensing a touch point since an image raw data can be quickly fetched due to only two sensing operations, i.e., concurrently (or one-by-one) sensing all the conductor lines in the first direction first and then in the second direction, for completing a frame, as well as a relatively reduced time required for converting a sensed signal from analog into digital; and (3) a lower power consumption due to the reduced amount of data to be processed.

However, such a self capacitance sensing also has the disadvantages as follows:

(1) When there is a floating conductor, such as a water drop, an oil stain, and the like, on the touch panel, it causes an error decision on a touch point.

(2) When there are multiple touch points concurrently on the touch panel, it causes a ghost point effect, so that such a self capacitance sensing cannot be used in multi-touch applications.

Another way of driving the typical capacitive touch panel is to sense a magnitude change of mutual capacitance (Cm) to thereby determine whether an object is toward the touch panel. Likewise, the mutual capacitance (Cm) is not a physical capacitor but a mutual capacitance between the conductor lines 230 in the first direction and in the second direction. FIG. 2 is a schematic diagram of a typical mutual capacitance sensing. As shown in FIG. 2, the drivers 210 are located on the first direction (Y), and the sensors 220 are located on the second direction (X). On the touch panel, the conductor lines 230 in the first direction, connected to the drivers 210, are also known as driving lines, and the conductor lines 230 in the second direction, connected to the sensors 220, are also known as sensing lines. During the upper half of the first time interval T1, the drivers 210 drive the conductor lines 230 in the first direction and use the voltage Vy_1 to charge the mutual capacitance (Cm) 250, and at the lower half, all sensors 220 sense voltages (Vo_1, Vo_2, ..., Vo_n) on the conductor lines 240 in the second direction to thereby obtain n data. Accordingly, the m*n data can be obtained after in driving periods.

Such a mutual capacitance sensing has the advantages as follows:

(1) It is easily determined whether a touch is generated from a human body since a signal generated from a floating conductor is in a different direction than a grounded conductor; and (2) Every touch point is indicated by a real coordinate, and the real position of each point can be found when multiple points are concurrently touched, so that such a mutual capacitance sensing can easily support the multi-touch applications.

A typical flat touch display is produced by stacking the touch panel directly over the flat display. Since the stacked transparent panel is transparent, the image can be displayed on the touch panel stacked over the flat display, and the touch panel can act as an input medium or interface.

However, such a way requires an increase of the weight of the touch panel due to the stack resulting in relatively increasing the weight of the flat display, which cannot meet with the requirement of compactness in current markets. Furthermore, when the touch panel and flat display are stacked directly, the increased thickness reduces the transmittance of rays and increases the reflectivity and haziness, resulting in greatly reducing the display quality of the screen.

To overcome this, the embedded touch control technology is adapted. The currently developed embedded touch control technologies are essentially on-cell and in-cell technologies. The on-cell technology uses a projected capacitive touch technology to form a sensor on the backside (i.e., a surface for attaching a polarized plate) of a color filter (CF) for being integrated into a color filter structure. The in-cell technology embeds sensors in an LCD cell to thereby integrate a touch element with a display panel such that the display panel itself is provided with a touch function without having to be attached or assembled to a touch panel. Such a technology typically is developed by a TFT LCD panel factory. The in-cell multi-touch panel technology is getting more and more mature, and since the touch function is directly integrated during a panel production process, without adding a layer of touch glass, the original thickness is maintained and the cost is reduced.

FIG. 3(A) is a schematic view of a configuration of a typical in-cell multi-touch panel 300. In FIG. 3(A), the panel 300 includes a lower polarizer 310, a lower glass substrate 320, a thin film transistor (TFT) or LTPS layer 330, a liquid crystal (LC) layer 340, a common voltage and touch driving layer 350, a color filter layer 360, an upper glass substrate 370, a detection electrode layer 380, and an upper polarizer 390. As shown in FIG. 3(A), in order to save the cost, a touch sensor is integrated with an LCD panel, and the common voltage layer of the LCD panel is located at a layer as same as the drivers of the touch sensor, thereby forming the common voltage and touch driving layer 350, so as to achieve the cost saving. The detection electrode layer 380 is located on the upper glass substrate 370. The TFT or LTPS layer 330 is constructed of thin film transistors (TFTs) or low-temperature poly-Si film transistors (LTPS) 332 and transparent electrodes 331.

FIG. 3(B) is a schematic view of another configuration of a typical in-cell multi-touch panel. As compared with FIG. 3(A), the difference in FIG. 3(B) is that the detection electrode layer 380 is located beneath the upper glass substrate 370.

FIG. 3(C) is a schematic view of yet another configuration of a typical in-cell multi-touch panel. As compared with FIG. 3(A), the difference in FIG. 3(C) is that the common voltage and touch driving layer 350 is located beneath the LC layer 340.

FIG. 3(D) is a schematic view of a further configuration of a typical in-cell multi-touch panel. As compared with FIG. 3(C), the difference in FIG. 3(D) is that the detection electrode layer 380 is located beneath the upper glass substrate 370.

The configuration of the in-cell multi-touch panel in any one of FIGS. 3(A), 3(B), 3(C) and 3(D) uses a time sharing to divide the time for one display frame into a display cycle and a touch cycle to thereby commonly use the common voltage layer of the display panel and the driving layer of the touch sensor. The timings for FIGS. 3(A), 3(B), 3(C) and 3(D) are shown in FIGS. 4(A), 4(B), 4(C) and 4(D), respectively.

As shown in FIG. 4(A), the time for one display frame is divided into one display cycle and one touch cycle, and the frame of the display panel is displayed in the display cycle before the touch sensing is performed in the touch cycle. As shown in FIG. 4(B), the touch sensing is performed before the frame of the display panel is displayed. As shown in FIG. 4(C), partial lines of one frame are displayed in a section A, and then the touch sensing is performed. Finally, the remaining lines of the frame are displayed in a section B. As shown in FIG. 4(D), a display of the vertical synchronous signal (Vsync) is changed such that the frame of the display panel is displayed when the vertical synchronous signal (Vsync) is at a high level. Conversely, when the vertical synchronous signal (Vsync) is at a low level, the touch sensing is performed.

In US Patent Publication 2012/0050217 entitled "Display device with touch detection function, control circuit, driving method of display device with touch detection function, and electronic unit", the timing of the first embodiment (shown in FIG. 8 of the patent publication) is as same as that in FIG. 4(A), in which the frame is displayed before the touch sensing is performed. The timing of the second embodiment (shown in FIG. 17 of the patent publication) is as same as that in FIG. 4(C), in which the partial lines of the frame is displayed in the section A, and then the touch sensing is performed; finally the remaining lines of the frame is displayed in the section B.

For such a time sharing, as the resolution of the display panel is getting higher, the number of pixels to be driven by the display driver IC is getting more, and thus the time required becomes longer. In this case, the display frame rate has to be maintained at 60 Hz or above, i.e., each frame only contains 16.6 ins. However, it is increasingly difficult to perform the image displaying and touch sensing in 16.6 ms due to the higher and higher resolution of the display panel. Therefore, the increasing image resolution is limited.

Accordingly, it is desirable to provide an improved in-cell multi-touch display panel system to mitigate and/or obviate the aforementioned problems.

SUMMARY OF THE INVENTION

The object of the present invention is to provide an in-cell multi-touch display panel system, which can overcome the prior problem of limiting the increased resolution of a display panel and share the same transparent conductive layer in driving of the common voltage layer (Vcom) and touch detection devices of an LCD panel, thereby saving the cost.

To achieve the object, there is provided an in-cell multi-touch display panel system, which comprises: a touch liquid crystal display (LCD) panel including: a thin film transistor (TFT) layer having K gate driving lines and L source driving lines for driving corresponding display transistors and capacitors based on a display pixel signal and a display driving signal so as to perform a display operation, where K and L are each a positive integer; a detection electrode layer having M first conductor lines for detecting whether there is an external object approached based on a touch driving signal, where M is a positive integer; and a common-voltage and touch-driving layer having N second conductor lines for receiving a common voltage signal in display and receiving a touch driving signal in touch detection, where N is a positive integer and K>N, wherein, in the detection electrode layer, there are a plurality of detection electrode areas, each being configured at an intersection of each first conductor line and each second conductor line, and connected to a corresponding first conductor line via a touch-control transistor, in which each first conductor line is connected to N detection electrode areas via N touch-control transistor, and the M×N touch-control transistors are divided into N sets corresponding to the N second conductor lines, respectively; and a touch display control subsystem connected to the TFT layer, the detection electrode layer, and the common-voltage and touch-driving layer to provide the display driving signal sequentially to the K gate driving lines and turn on the corresponding display transistors for providing the display pixel signal to the L source driving lines thereby performing a display operation, and provide the touch driving signal to the N second conductor lines and sample detection voltages from the M first conductor lines for detecting whether there is the external object approached; wherein the K gate driving lines are divided into N sets each corresponding to one of the N second conductor lines, such that, when one set of gate driving lines has the display driving signal, the second conductor line corresponding to the set of gate driving lines is connected to the common voltage and, when the touch display control subsystem provides the touch driving signal to the i-th second conductor line, the touch display control subsystem determines whether the display driving signal is provided to the i-th second conductor lines at the same time and, if not, provides the touch driving signal to the i-th second conductor line and M first conductor lines and turns on the i-th set of touch-control transistors corresponding to the i-th second conductor line, where i is an index of 2 to N.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
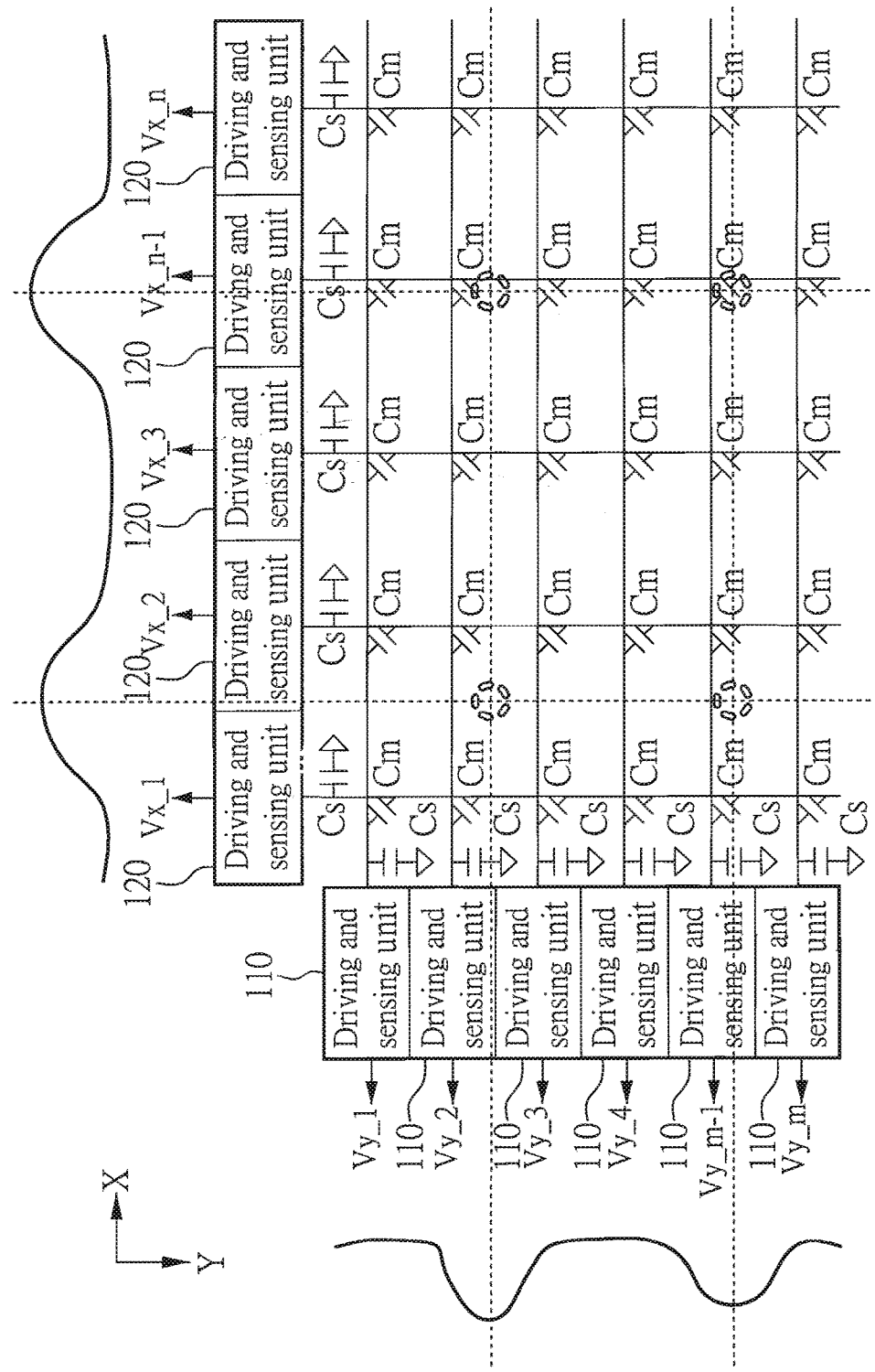
FIG. 1 is a schematic diagram of a typical self capacitance sensing.
Figure 2:
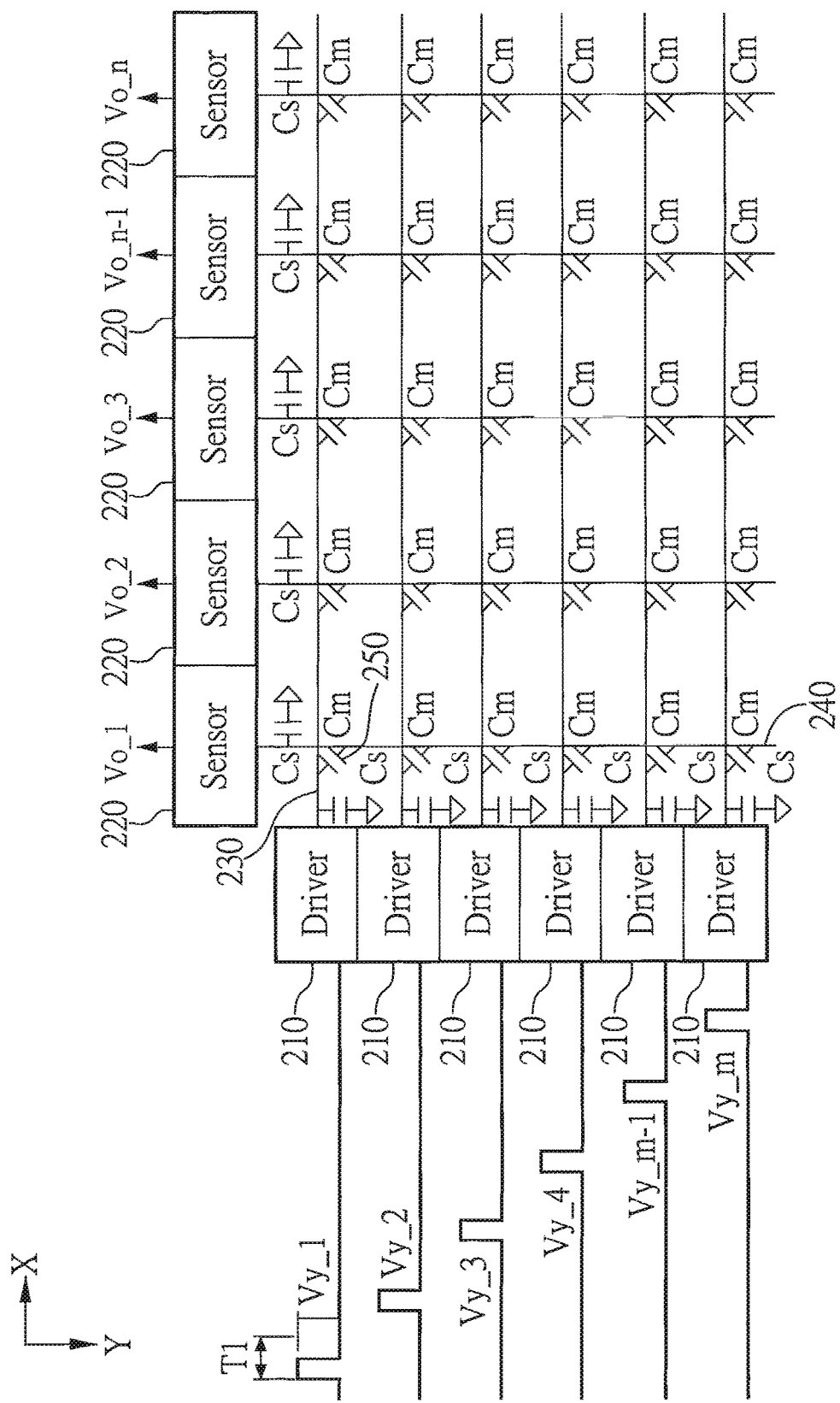
FIG. 2 is a schematic diagram of a typical mutual capacitance sensing.
Figure 3A:
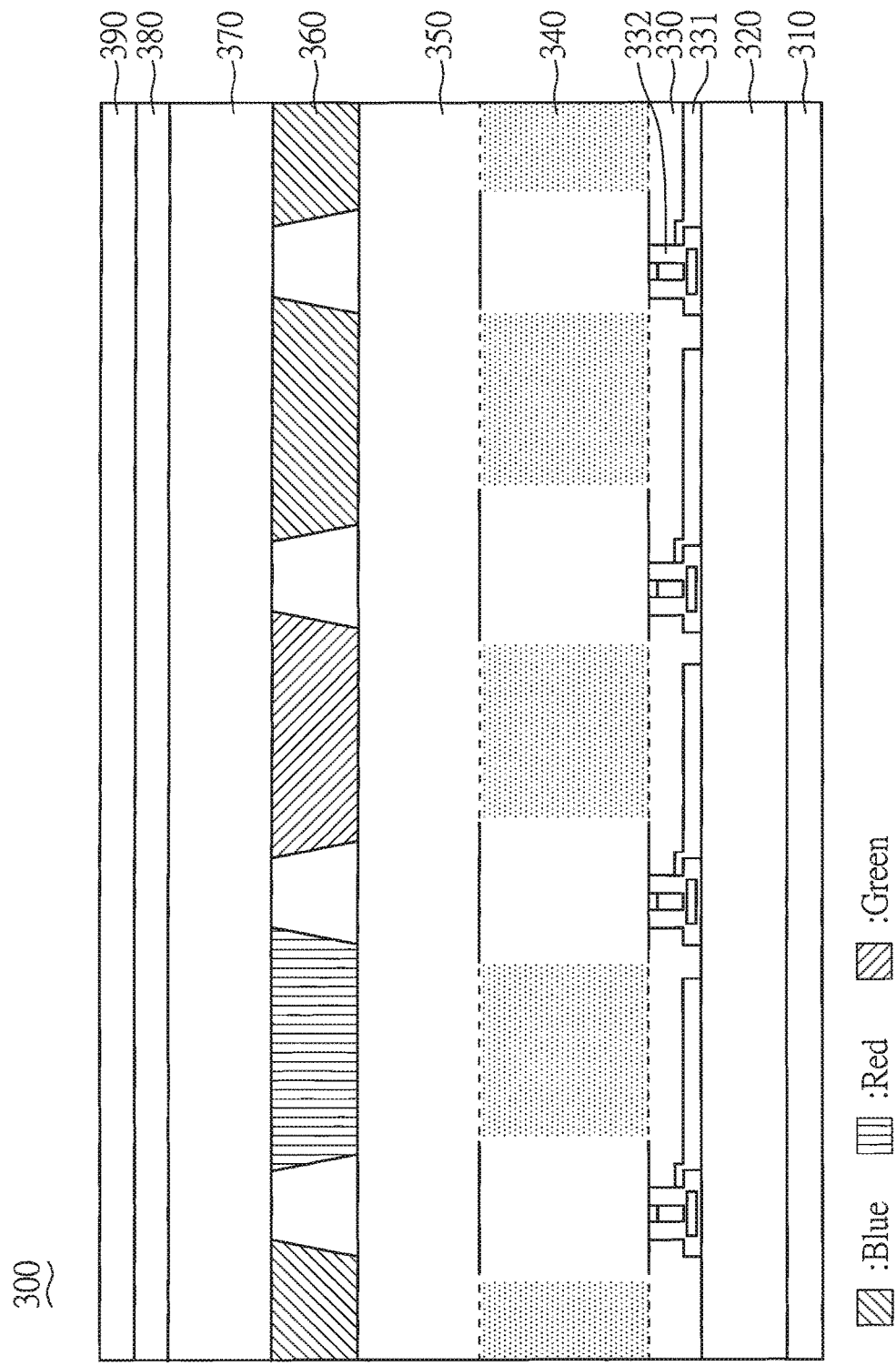
FIGS. 3(A)-3(D) show the configuration of a typical in-cell multi-touch panel.
Figure 3B:
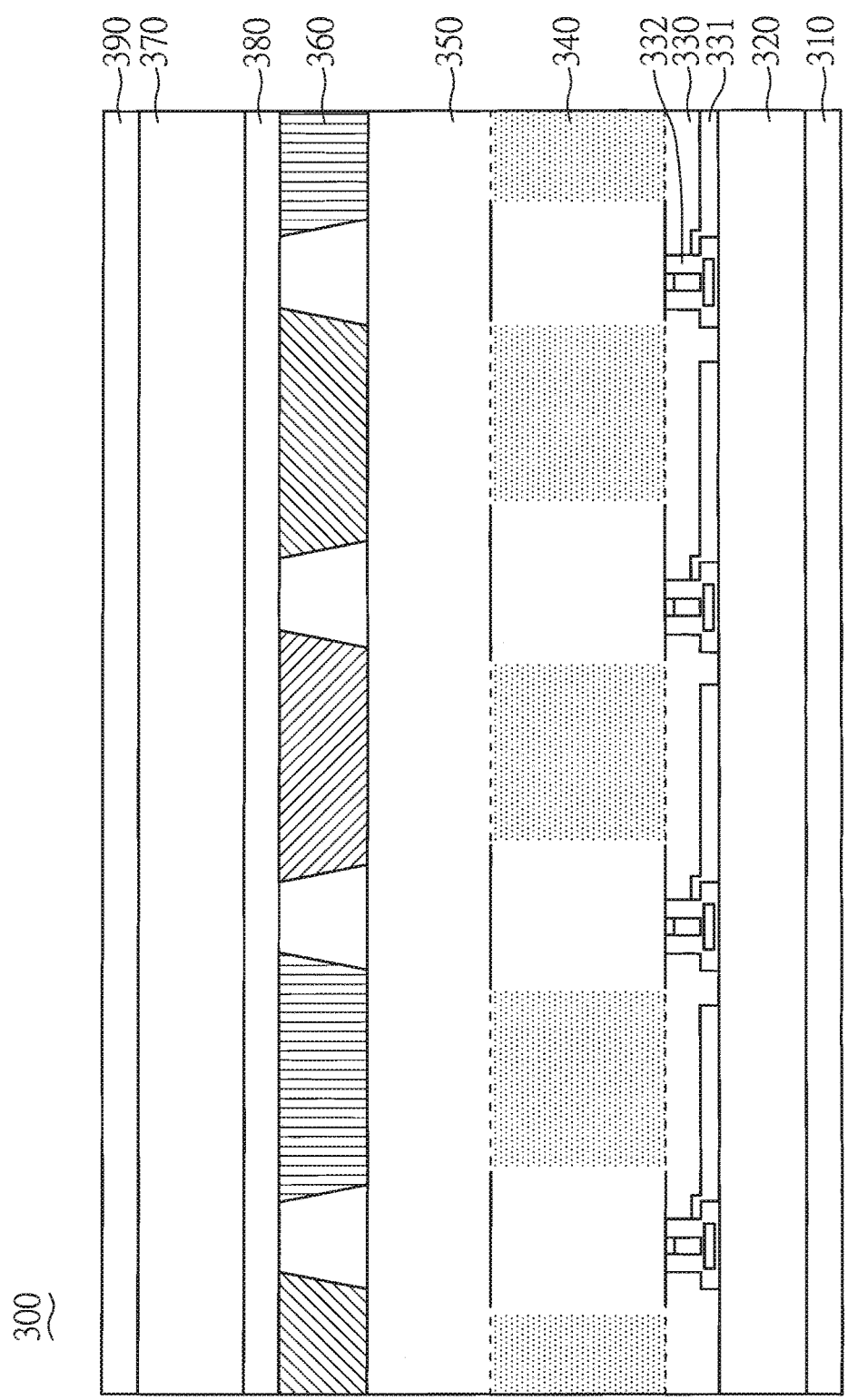
Figure 3C:
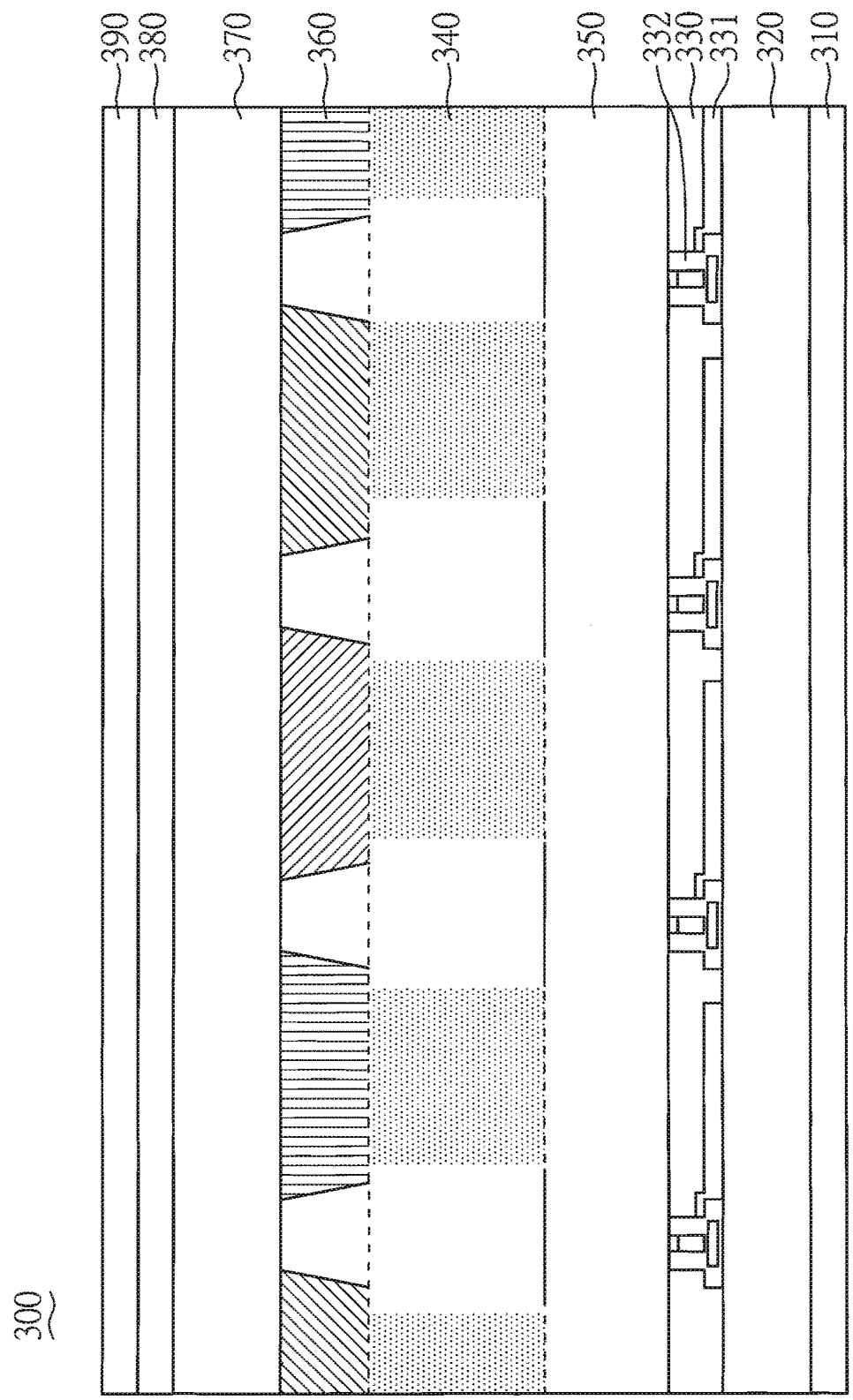
Figure 3D:
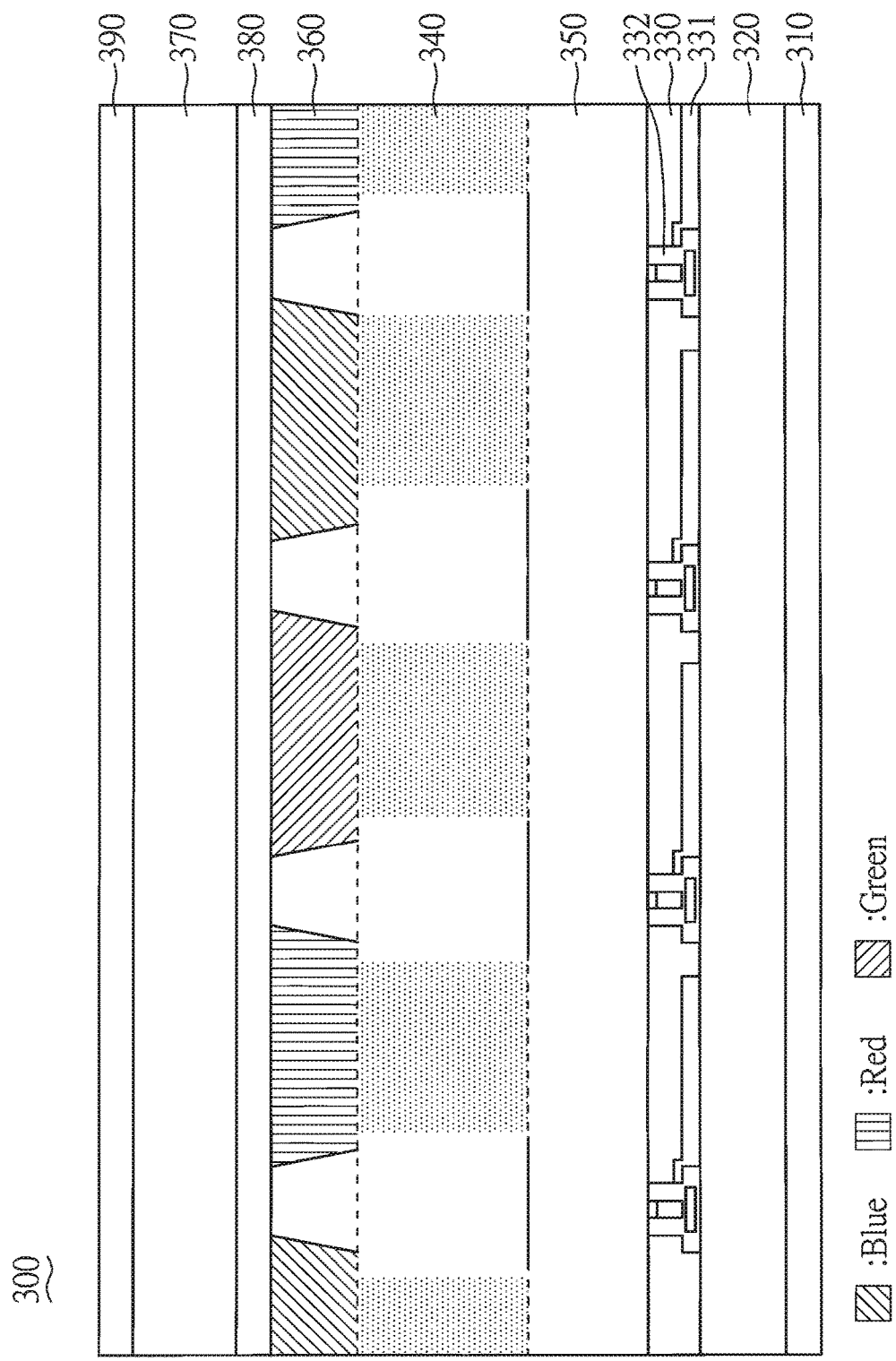
Figure 4A:
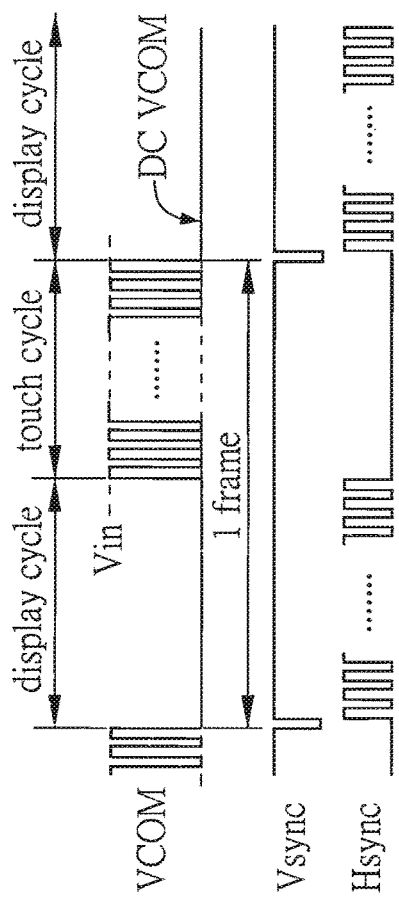
FIGS. 4(A)-4(D) show the timing of a typical in-cell multi-touch panel.
Figure 4B:
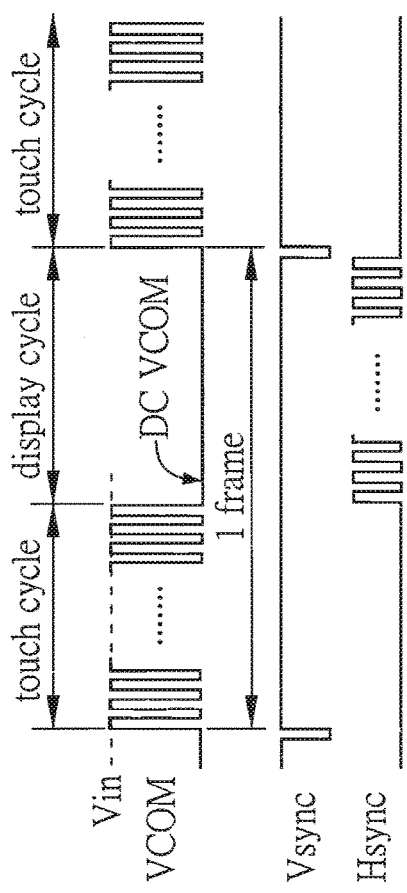
Figure 4C:
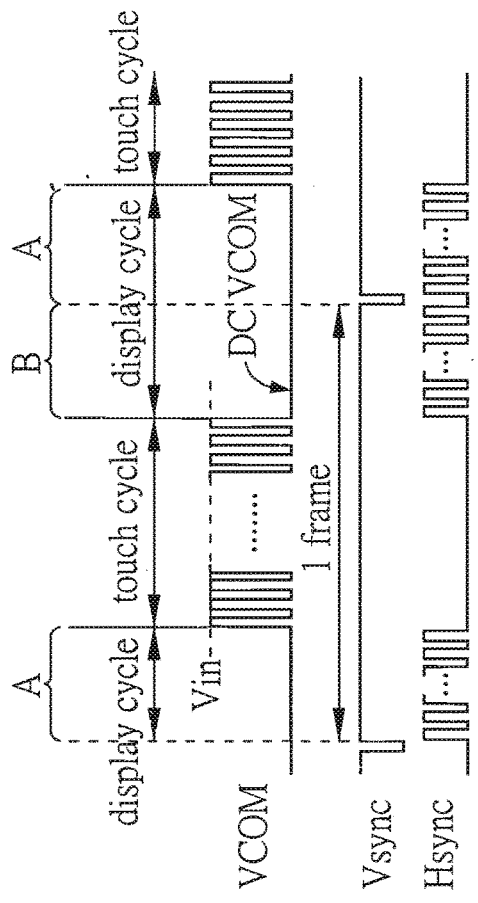
Figure 4D:
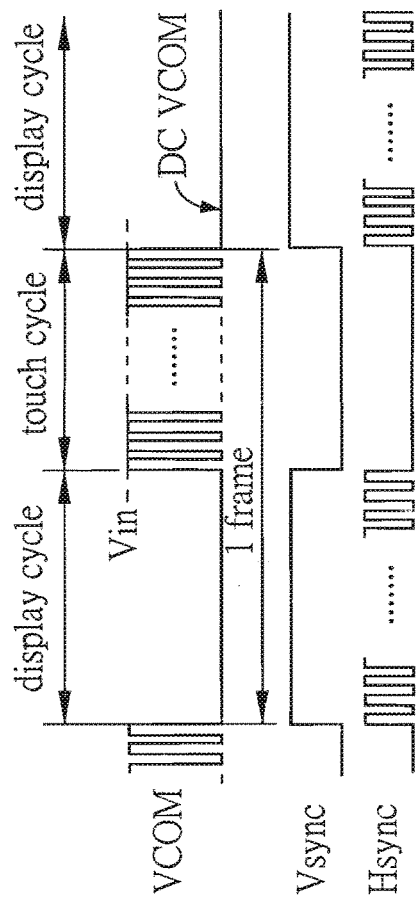
Figure 5:
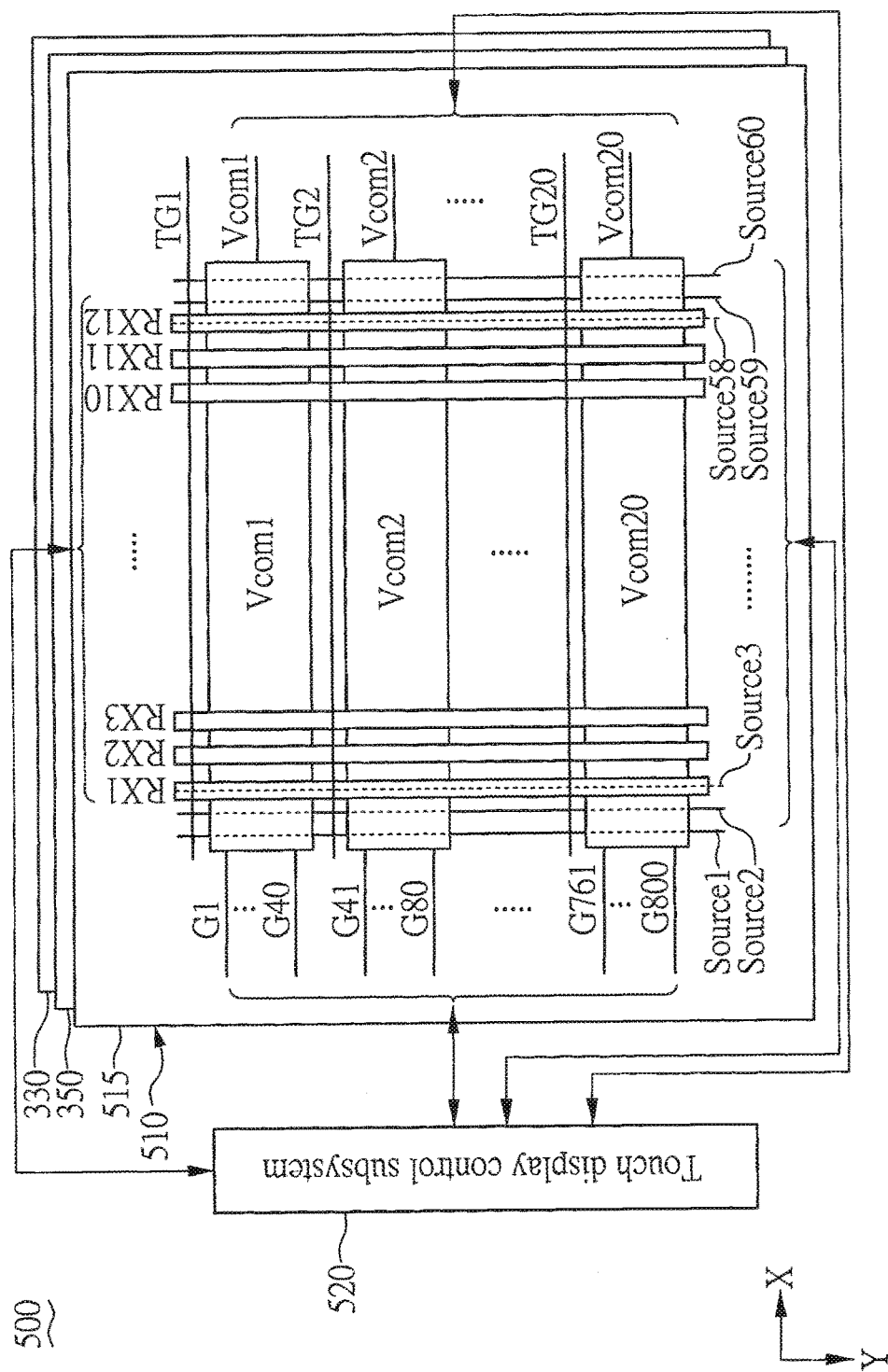
FIG. 5 is a block diagram of an in-cell multi-touch display panel system according to the invention.

FIG. 5 is a block diagram of an in-cell multi-touch display panel system 500 according to the invention. The in-cell multi-touch display panel 500 includes a touch LCD panel 510 and a touch display control subsystem 520.

The touch LCD panel 510 has a thin film transistor (TFT) layer 330, a detection electrode layer 515, and a common-voltage and touch-driving layer 350, wherein the three layers 330, 350 and 515 can be combined and stacked into one of the configurations shown in FIGS. 3(A)-3(D).

The TFT layer 330 has K gate driving lines (G1, G2, . . . , GK) and L source driving lines (SOURCE1, SOURCE2, . . . , SOURCEL) in order to drive display transistors DTr and capacitors $C_{LC}$ corresponding to pixels of the LCD panel 510 based on a display pixel signal and a display driving signal in display, where K, L are each a positive integer. For convenience of description, in this embodiment, we have K=800 and L=600.

The active element of the TFT transistor layer 330 is the TFT in this embodiment. In other embodiments, the active element can be a low temperature polysilicon (LTPS) TFT, indium gallium zinc oxide (IGZO) TFT, or continuous grain silicon (CGS).

Specifically, the detection electrode layer 515 of the present invention is different from the detection electrode layer 380 in prior art. The detection electrode layer 515 has M first conductor lines (RX1, RX2, . . . , RX12) for detecting whether there is an external object approached based on a touch driving signal, where M is a positive integer. In this embodiment, we have M=12.

The common-voltage and touch-driving layer 350 has N second conduct lines (Vcom, Vcom2, . . . , Vcom20) in order to receive a common voltage signal in display and receive the touch driving signal in touch detection, where N is a positive integer, and K>N. In this embodiment, we have N=20.

Figure 6:
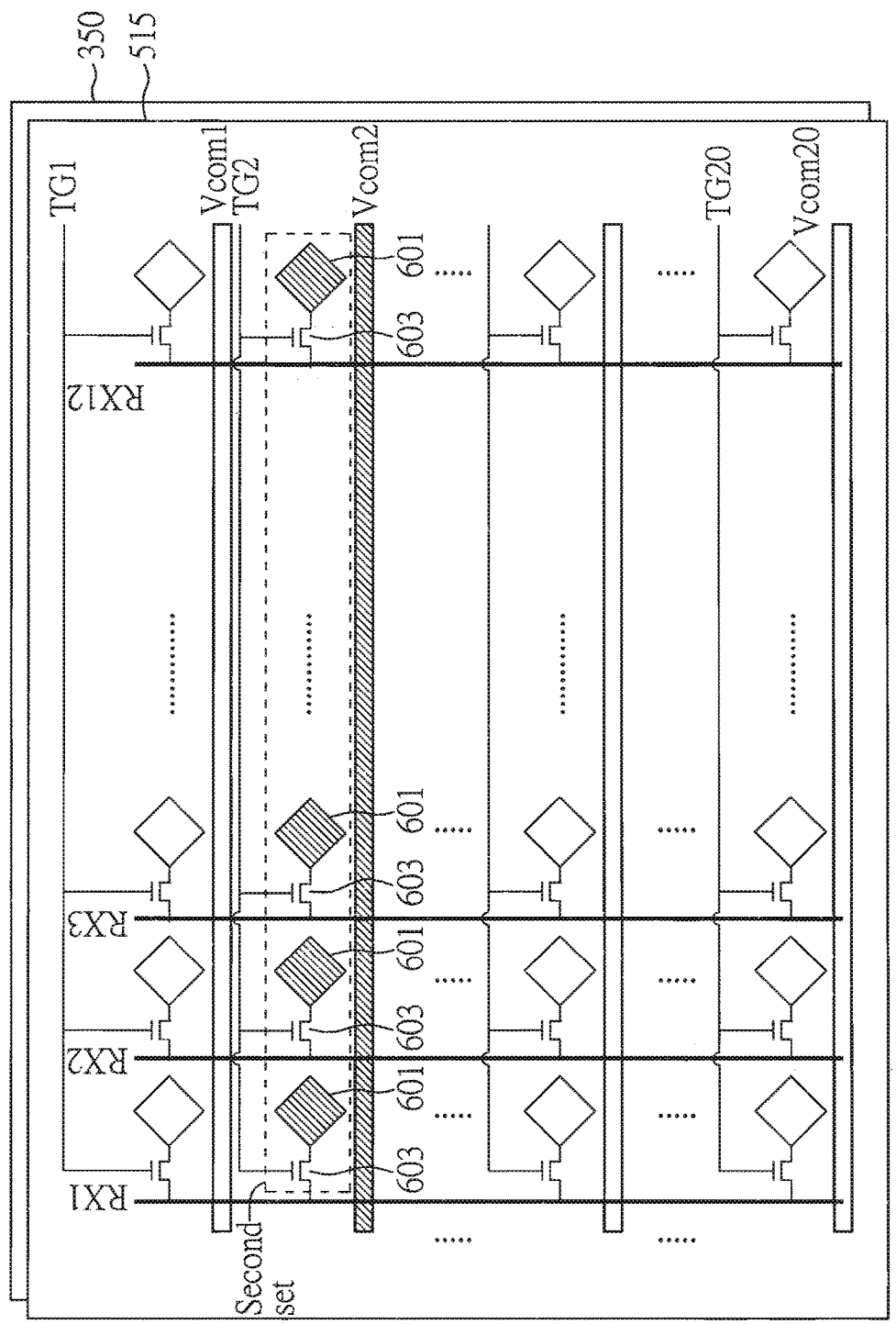
FIG. 6 schematically illustrates the detection electrode layer and the common-voltage and touch-driving layer in accordance with the present invention.

FIG. 6 schematically illustrates the detection electrode layer 515 and the common-voltage and touch-driving layer 350 in accordance with the present invention. In the detection electrode layer 515, there are a plurality of detection electrode areas 601, each being configured at an intersection of each first conductor line (RX1, RX2, . . . , RX12) and each second conductor line (Vcom1, Vcom2, . . . , Vcom20). Each detection electrode area 601 is connected to the corresponding first conductor line (RX1, RX2, . . . , RX12) via a touch-control transistor 603. Each first conductor line (RX1, RX2, . . . , RX12) is connected to N detection electrode areas 601 via N touch-control transistor 603, where N is 20 in this embodiment. The M×N (12×2) touch-control transistors 603 and detection electrode areas 601 are divided into N (=20) sets, each set of touch-control transistors 603 and detection electrode areas 601 corresponding to a second conductor line. The gates of the touch-control transistor 603 in each set are connected to a corresponding touch gate driving line (TG1, TG1, . . . , TG20), so as to turn on or turn off the set of touch-control transistors by using the touch gate driving line (TG1, TG1, . . . , TG20).

In order to save cost, the first conductor lines (RX1, RX2, . . . , RX12), detection electrode areas 601 and touch-control transistors 603 in the detection electrode layer 515 can be designed to be disposed in the thin film transistor layer (TFT or LTPS) 330.

When the touch display control subsystem 520 provides the touch driving signals to the i-th second conductor line and M first conductor lines (RX1, RX2, ..., RX12), the touch display control subsystem 520 turns on the i-th set of touch-control transistors 603 corresponding to the i-th second conductor line. As shown in FIG. 6, when the touch display control subsystem 520 provides the touch driving signal to the 2-nd second conductor line Vcom2, the touch display control subsystem 520 turns on the second set of touch-control transistors 603 corresponding to the 2-nd second conductor line Vcom2 Therefore, the voltages detected by the second set of detection electrode areas 601 can be reflected to the M first conductor lines (RX1, RX2, ..., RX12), respectively. At this moment, the other sets of touch-control transistors 603 are not turned on and thus the touch driving signals on the 2-nd second conductor line Vcom2 detected by the other sets of detection electrode areas 601 are not reflected to the M first conductor lines (RX1, RX2, ..., RX12).

When the touch display control subsystem 520 provides the touch driving signal to the 2-nd second conductor line Vcom2, it indicates that the touch display control subsystem 520 wants to detect whether there is a touch around the 2-nd second conductor line Vcom2. In the present invention, only the second set of touch-control transistors 603 corresponding to the 2-nd second conductor line Vcom2 is turned on, while the other sets of touch-control transistors 603 are not turned on. Thus, the touch driving signals on the 2-nd second conductor line Vcom2 detected by the other sets of detection electrode areas 601 are not reflected to the M first conductor lines (RX1, RX2, ..., RX12), thereby enabling the touch detection to be more accurate.

In this embodiment, the detection electrode area 601 is a diamond shape. Alternatively, the detection electrode area 601 can be a square, rectangle or round shape.

The M first conductor lines (RX1, RX2, ..., RX12) and L source driving lines (SOURCE 1, SOURCE 2, ..., SOURCE L) are disposed along a first direction (Y direction), and the K gate driving lines (G1, G2, ..., G800) and N second conductor lines (Vcom1, Vcom2, ..., Vcom20) are disposed along a second direction (X direction), where the first direction is substantially vertical with the second direction.

In this embodiment, the K gate driving lines (G1, G2, ..., G800) correspond to the N second conductor lines (Vcom1, Vcom2, ..., Vcom20). That is, the gate driving lines G1 to G40 correspond to the second conductor line Vcom1, the gate driving lines G41 to G80 correspond to the second conductor line Vcom2, and so on. In other words, the gate driving lines G1 to G40 are the first group, the gate driving lines G41 to G80 are the second group, ..., and the gate driving lines G761 to G800 are twentieth group. More specifically, the first group of gate driving lines G1 to G40 is disposed at the thin film transistor layer 30 and the corresponding second conductor line Vcom1 is disposed at the same position of the common-voltage and touch-driving layer 350, while the same configuration applies to other groups.

When K is not an integral multiple of N, for example K=802 and N=20, the gate driving lines G1 to G41 correspond to the second conductor line Vcom1, the gate driving lines G42 to G82 correspond to the second conductor line Vcom2, the gate driving lines G83 to G122 correspond to the second conductor line Vcom3, and so on.

The touch display control subsystem 520 is connected to the thin film transistor layer 330, the detection electrode layer 515, and the common-voltage and touch-driving layer 350. The touch display control subsystem 520 sequentially provides the display driving signal to the K (=800) gate driving lines for turning on the corresponding display transistors DTr and providing the display pixel signals to the L (=600) source driving lines, so as to execute display operation.

The touch display control subsystem 520 sequentially provides the touch driving signal to the N second conductor lines (Vcom1, Vcom2, ..., Vcom20) and M first conductor lines (RX1, RX2, ..., RX12), and turns on the i-th set of touch-control transistors corresponding to the i-th second conductor line, so as to allow the M first conductor lines (RX1, RX2, ..., RX12) to sample detection voltages thereby detecting whether there is an external object approached.

The K (=800) gate driving lines are divided into N (=20) sets, each set of gate driving lines corresponding to a second conductor line. When one set of the gate driving lines has the display driving signal, the corresponding second conductor line is connected to the common voltage (Vcom) for use as grounding in display operation.

Figure 7:
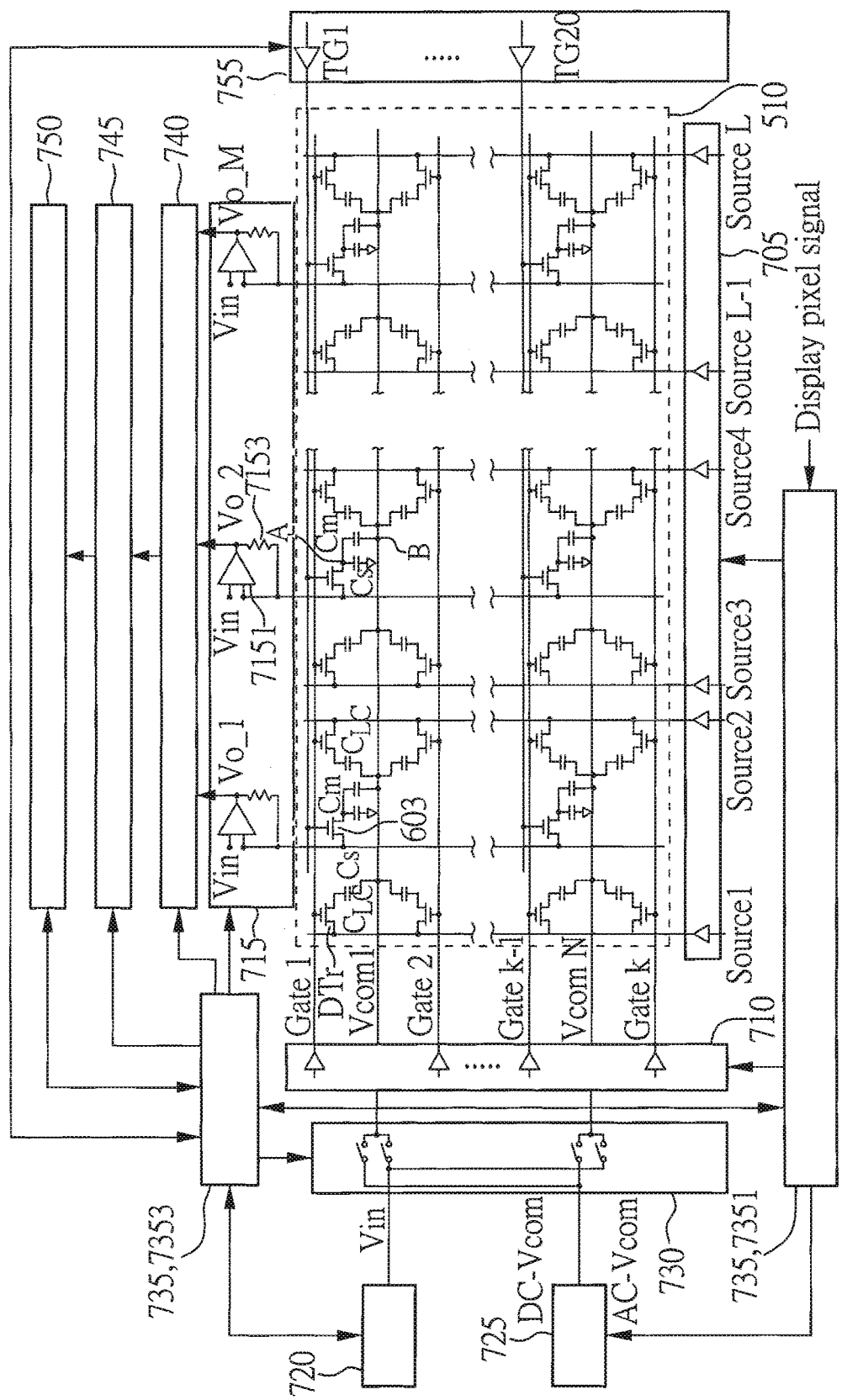
FIG. 7 is a circuit diagram of the in-cell multi-touch display panel of FIG. 5 in accordance with an embodiment of the present invention.

FIG. 7 is a circuit diagram of the in-cell multi-touch display panel 500 of FIG. 5 in accordance with an embodiment of the present invention. As shown, the touch display control subsystem 520 includes a source driver 705, a gate driver 710, a detection device 715, a touch driving signal generator 720, a common voltage generator 725, a switch 730, a control device 735, a set of programmable gain amplifiers 740, a set of analog to digital converters 745, a coordinate determination device 750, and a touch-control transistor gate driver 755.

The source driver 705 is connected to the touch LCD panel 510 for driving the touch LCD panel 510 based on the display pixel signal.

The gate driver 710 is connected to the touch LCD panel 510 for generating the display driving signal, so as to drive the touch LCD panel 510.

The detection device 715 is connected to the touch LCD panel 510 for detecting signals of the touch LCD panel 510.

The touch driving signal generator 720 is provided to generate touch driving signal VIN. Specifically, the touch driving signal generator 720 is able to generate touch driving signal VIN required by the self capacitance technology.

The common voltage generator 725 is provided to generate a common voltage (Vcom). Specifically, the common voltage generator 725 is able to generate DC common voltage (DC-Vcom) or AC common voltage (DC-Vcom).

The switch 730 is connected to the touch LCD panel 510, the touch driving signal generator 720, and the common voltage generator 725.

The control device 735 includes a display timing controller 7351 and a touch timing controller 7353. The control device 735 is connected to the source driver 705, the gate driver 710, the common voltage generator 725, the detection device 715, the touch driving signal generator 720, the switch 730, the set of programmable gain amplifiers 740, the set of analog to digital converters 745, the coordinate determination device 750, and the touch-control transistor gate driver 755, thereby configuring the switch 730 to provide the touch driving signal or the common voltage (Vcom) to the N second conductor lines and provide the touch driving signal to the M first conductor lines, configuring the gate driver 710 to sequentially output the display driving signal to the K gate driving lines, configuring the source driver 705 to output the display pixel signal to the L source driving lines, and configuring the N sets of touch-control transistors to be turned on and off.

The display timing controller 7351 is connected to the source driver 705, the gate driver 710, and the common voltage generator 725 for providing the timing of outputting the display pixel signal and the display driving signal to the source driver 705 and the gate driver 710, and the timing of generating the common voltage (Vcom) to the common voltage generator 725.

The touch timing controller 7353 is connected to the display timing controller 7351, the detection device 715, the touch driving signal generator 720, the switch 730, and the touch-control transistor gate driver 755, thereby configuring the switch to provide the touch driving signal VIN or the common voltage (Vcom) to the N second conductor lines and provide the touch driving signal to the M first conductor lines, and configuring the N sets of touch-control transistors to be turned on or off.

The set of programmable gain amplifiers 740 is connected to the detection device 715 for amplifying the M detection signals thereby generating M amplified detection signals.

The set of analog to digital converters 745 is connected to the set of programmable gain amplifiers 740 for converting the M amplified detection signals into M digital detection signals.

The coordinate determination device 750 is connected to the set of analog to digital converters 745 for determining the coordinate position of the external object based on the M digital detection signals.

Each of the M first conductor lines and the N second conductor lines has parasitic capacitance and stray capacitance. There is mutual capacitance (Cm) formed at an overlap of each of the M first conductor lines and each of the N second conductor lines. Each of the first conductor lines (RX1, RX2, . . . , RX12) and the second conductor lines (Vcom1, Vcom2, . . . , Vcom20) has a capacitance with respect to ground, defined as self capacitance (Cs).

The detection device 715 has M detection circuits for detecting the self capacitance, so as to generate the corresponding M detection signals.

Each detection circuit of the detection device 715 is composed of an amplifier 7151 and a resistor 7153. The resistor 7153 has one end connected to the output end of the amplifier 7151 and the other end connected to the negative output end of the amplifier 7151 and one of the M first conductor lines (RX1, RX2, . . . , RX12). The positive input end of the amplifier 7151 is connected to receive the touch driving signal VIN.

As shown in FIG. 7, in performing touch detection, the touch driving signal generator 720 is provided to generate the touch driving signal VIN, wherein the touch driving signal VIN is provided to the 1-st second conductor line Vcom1 and also provided to the M first conductor lines (RX1, RX2, . . . , RX12), and the touch timing controller 7353 also drives the touch-control transistor gate driver 755, so as to turn on the first set of touch-control transistors through the touch gate driving line TG1. Because the resistance of the resistor 7153 is relatively small, the end A can be deemed as the touch driving signal VIN and. At the same time, the end B is the touch driving signal VIN, indicating that the mutual capacitance Cm between the end A and the end B is deemed to be not existed due to short circuit. That is, in performing self capacitance touch detection, the present invention is not influenced by mutual capacitance Cm, so as to increase the accuracy in touch detection.

That is, at first, the first second conductor line Vcom1 is at voltage level of DC-Vcom, and then the gate driving lines (G1, G2, . . . , G800) sequentially provide the display driving signal and the source driving lines (SOURCE 1, SOURCE 2, . . . , SOURCE L) sequentially provide the display pixel signal for refreshing display, wherein the gate driving line turns on the display transistor DTr for a pixel so as to allow the display pixel signal to charge the capacitor $C_{LC}$. When completing the gate driving lines (G1 to G40) corresponding the 1-st second conductor line Vcom1, the touch driving signal VIN is then provided to the 1-st second conductor line Vcom1 and the M first conductor lines (RX1, RX2, . . . , RX12) for detecting the self capacitance (Cs) of each conductor line on the panel, thereby determining whether there is a touch.

At the same time, the touch driving signal VIN is also provided to the M first conductor lines (RX1, RX2, . . . , RX12) to drive the mutual capacitance Cm, and the voltages at two ends of the mutual capacitance are equal at this moment so that there is no charge/discharge in the mutual capacitance Cm. That is, the current on the M first conductor lines (RX1, RX2, . . . , RX12) is caused from charging/discharging the self capacitance (Cs) with respect to the ground. As a result, it is able to easily exclude the influence from mutual capacitance Cm so as to determine whether there is a touch, wherein only the self capacitance Cs with respect to ground is determined when there is a touch.

The operation principle of the touch display control subsystem 520 is described hereinafter. When the touch display control subsystem 520 provides the touch driving signal to the i-th second conductor line, it first determines whether the display driving signal is concurrently provided and, if not, it provides the touch driving signal to the i-th second conductor line. Thus, both display and touch detection can be made concurrently.

Figure 8:
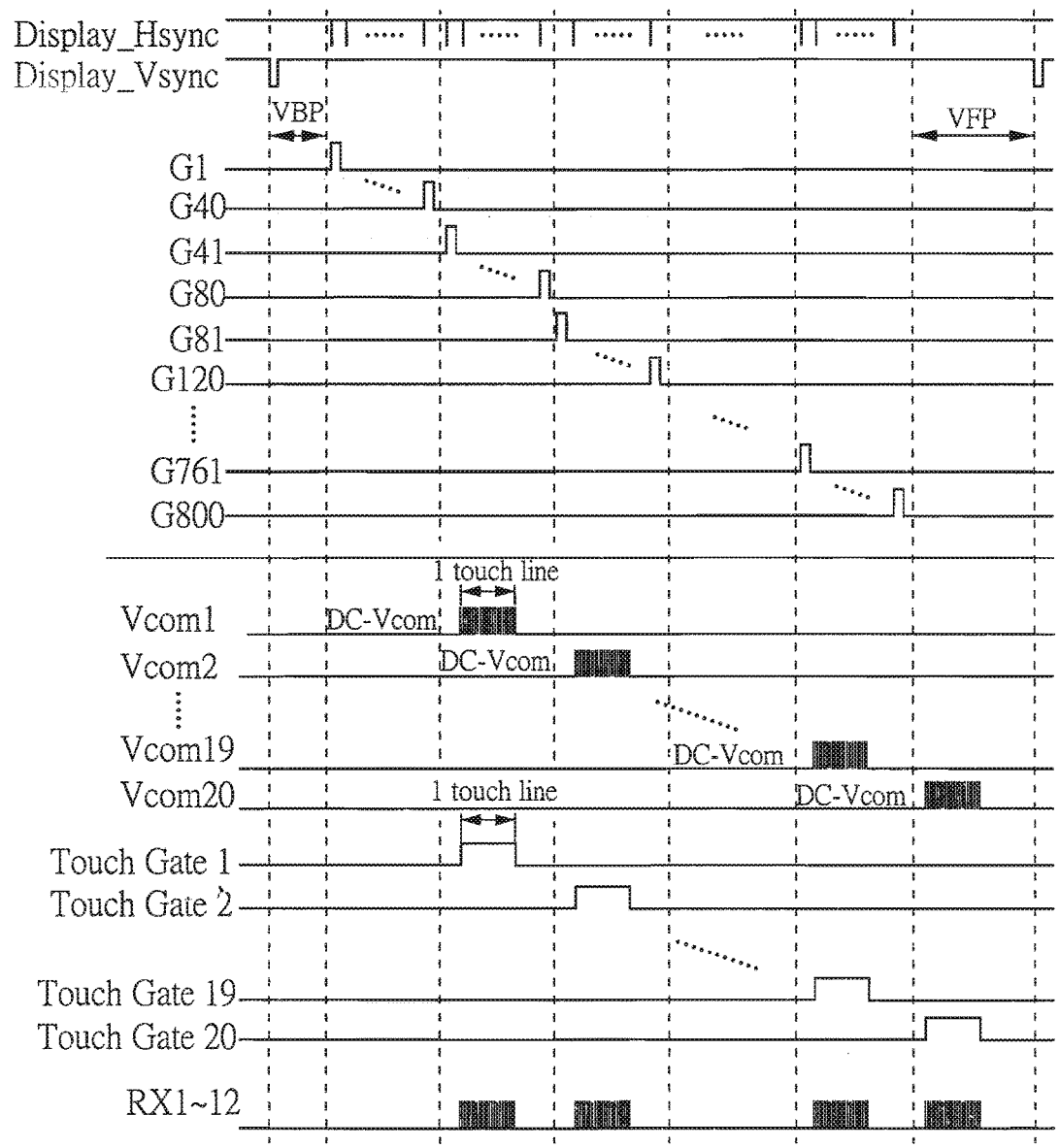
FIG. 8 shows a timing of an embodiment of the touch display control subsystem in display and touch detection according to the invention.

FIG. 8 shows a timing of an embodiment of the touch display control subsystem 520 in display and touch detection according to the invention. First, when the touch display control subsystem 520 provides the display driving signal to the first set of gate driving lines, it provides the common voltage (Vcom) to the N second conductor lines in order to connect the N second conductor lines to the common voltage (Vcom).

When the touch display control subsystem 520 provides the display driving signal to the i-th set of gate driving lines, it provides the touch driving signal to the (i−1)-th second conductor line and the M first conductor lines, and turns on the (i−1)-th set of touch-control transistors corresponding to the (i−1)-th second conductor line, where i=2 to N.

When the touch display control subsystem 520 provides the display driving signal to the N-th set of gate driving lines, it provides the touch driving signal to the N-th second conductor line and the M first conductor lines, and turns on the N-th set of touch-control transistors corresponding to the N-th second conductor line.

The timing of FIG. 8 shows that a change in partial timing is not necessary completely. Namely, the timing of using the touch display control subsystem 520 to provide the display driving signal to the K gate driving lines (G1, G2, . . . , G800) is as same as that of the original LCD panel. As shown in FIG. 8, when a vertical synchronous signal (Vsync) is inputted, the first group of gate driving lines G1-G40 corresponding to the second conduct line Vcom1 at the same location is sequentially driven and, at this moment, the second conductor line Vcom1 has no change. The touch display control subsystem 520 provides the common voltage (Vcom) to the second conductor line Vcom1 and other N−1 second conductor lines to thereby connect the N second conductor lines to the common voltage (Vcom).

When the gate driving line G41 is driven, the touch display control subsystem 520 starts to provide the touch driving signal to the second conductor line Vcom1 and all of the M first conductor lines and turn on the first set of touch-control transistors corresponding to the second conductor line Vcom1, and samples touch voltages from the M first conductor lines (RX1, RX2, ..., RX12) for detecting whether an external object approaches to the second conductor line Vcom1.

When the gate driving line G81 is driven, the touch display control subsystem 520 starts to provide the touch driving signal to the second conductor line Vcom2 and all of the M first conductor lines and turn on the second set of touch-control transistors corresponding to the second conductor line Vcom2, and samples touch voltages from the M first conductor lines (RX1, RX2, ..., RX12) for detecting whether an external object approaches to the second conduct line Vcom2.

As shown in FIG. 8, the display and touch data associated with the second conductor lines Vcom1 to Vcom20 is sequentially completed, and there is no need of performing the time sharing or reducing the driving time in display timing due to a touch detection to be performed.

Figure 9:
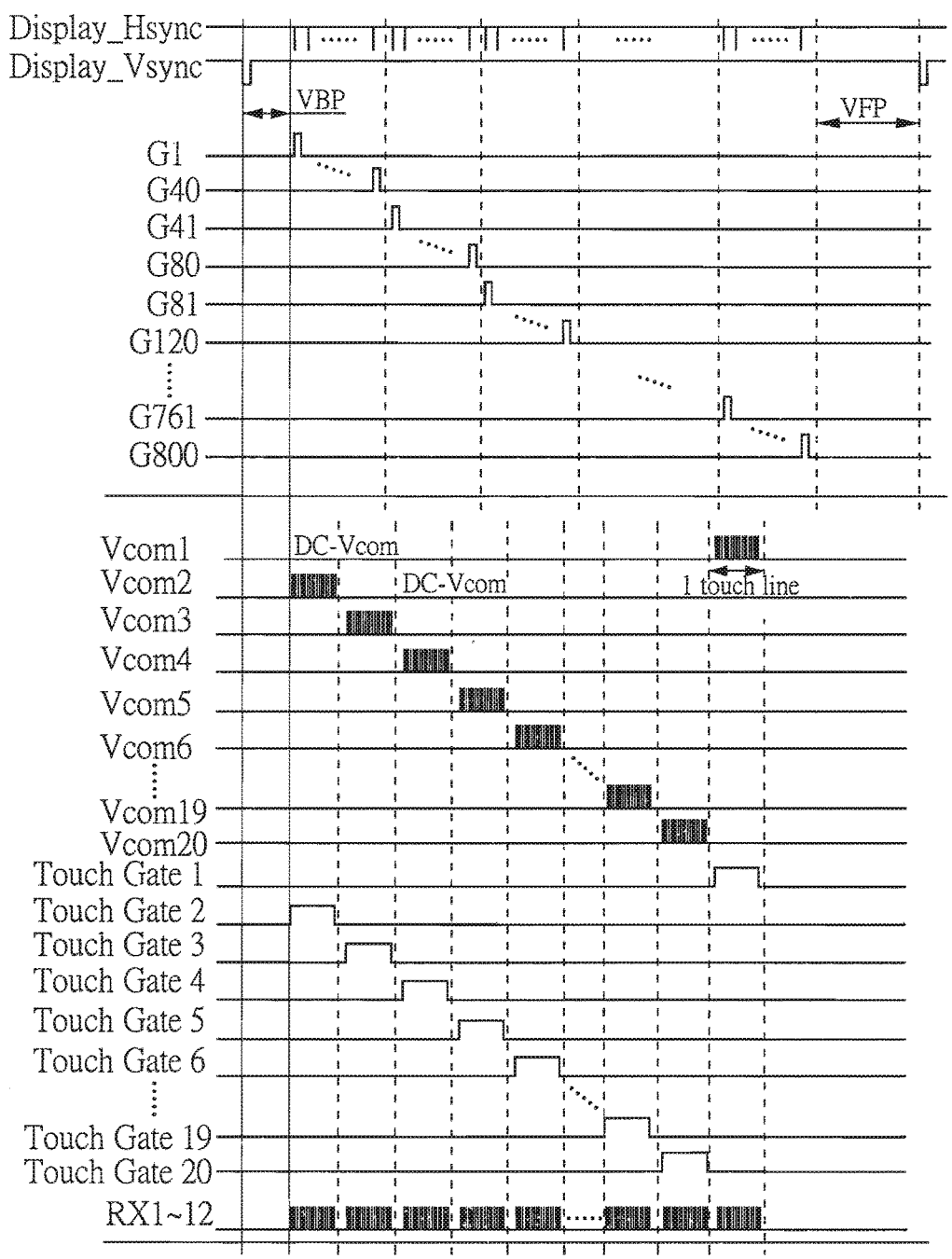
FIG. 9 is a timing of another embodiment of the touch display control subsystem in display and touch detection according to the invention.

FIG. 9 is a timing of another embodiment of the touch display control subsystem 520 in display and touch detection according to the invention. As shown in FIG. 9, the touch display control subsystem 520 concurrently provides the display driving signal to the N sets of gate driving lines (G1, G2, ..., G800) and the touch driving signal to the N second conductor lines (Vcom1, Vcom2, ..., Vcom20) and M first conductor lines in a predetermined time. As shown in FIG. 9, the touch display control subsystem 520 provides the display driving signal to the first to N-th groups of gate driving lines sequentially in a predetermined time when a VBP time passes after the vertical synchronous signal (Vsync). At the same time, the touch display control subsystem 520 provides the touch driving signal to the M first conductor lines sequentially in the predetermined time (after the VBP time), and also provides the touch driving signal to the 2-nd to N-th second conductor lines and the 1-st second conductor line sequentially in the predetermined time.

FIG. 9 shows another similar concept of control timing, which is assumed that the time required for driving one second conduct line Vcom1 is smaller than that for driving one group of gate driving lines G1 to G40. Thus, after the vertical synchronous signal Vsync, the subsystem 520 first drives the first group of gate driving lines G1 to G40 sequentially, where the first group of gate driving lines G1 to G40 are located in a position as same as the second conductor line Vcom1 in the common-voltage and touch-driving layer 350. When the touch display control subsystem 520 sequentially drives the first group of gate driving lines G1 to G40, it provides the touch driving signal to the M first conductor lines and the second conduct line Vcom2 and, at this moment, turns on the second set of touch-control transistors corresponding to the second conductor line Vcom2, provides the touch driving signal to the second conductor lines Vcom3, Vcom4, ..., Vcom20 sequentially, and finally provides the touch driving signal to the second conductor line Vcom1 thereby completing the touch scanning procedure for one full frame. When the touch display control subsystem 520 provides the touch driving signal to the second conductor lines Vcom3, Vcom4, ..., Vcom20 sequentially, it sequentially turns on the set of touch-control transistors corresponding to the aforementioned second conductor lines.

Such a driving scheme as shown in FIG. 9 can be used without any problem if it is ensured that the touch driving signal is provided to the second conductor line Vcom1 after the display driving signal G41 and above are provided by the touch display control subsystem 520.

Furthermore, it is noted that the scanning frequency of the touch lines is not necessary to be consistent with that of the display lines, and the scanning frequency of the touch screen is not necessary to be consistent with that of the display screen. In addition, the scan time of the touch screen at start is not necessary to be synchronous with the display time of the display screen at start, and the driving frequency of the touch driving signal on the second conductor lines is not necessary to be consistent with the scanning frequency of the display lines. That is, when the display screen has an updated frequency of 60 Hz, the scanning frequency of the touch screen is not limited to 60 Hz.

Figure 10:
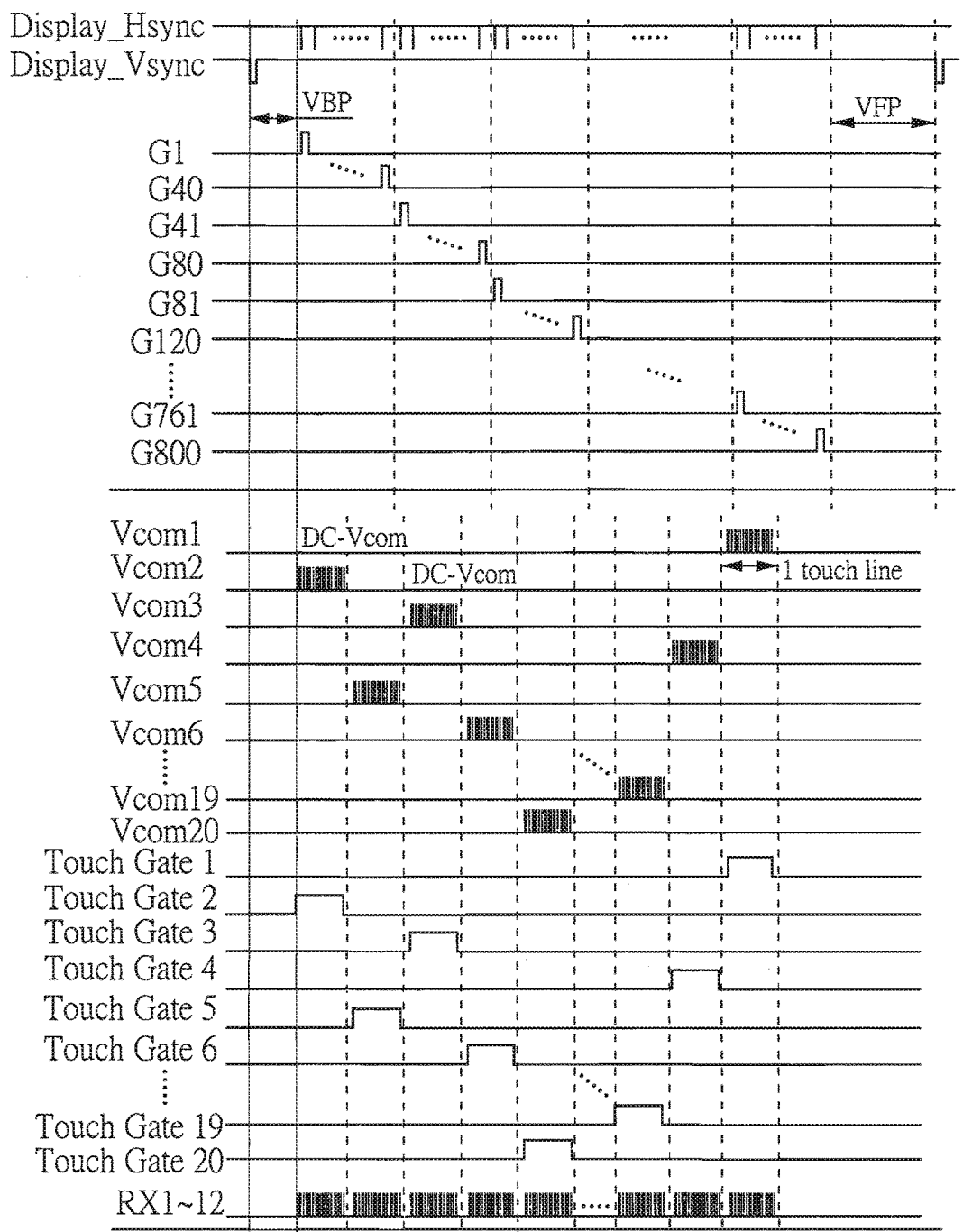
FIG. 10 is a timing of still another embodiment of the touch display control subsystem in display and touch detection according to the invention.

FIG. 10 is a timing of still another embodiment of the touch display control subsystem 520 in display and touch detection according to the invention. When the touch display control subsystem 520 non-sequentially provides the touch driving signal to the i-th second conductor line, it first determines whether the display driving signal is also provided to the i-th set of gate driving lines. If yes, the touch display control subsystem 520 provides the touch driving signal to the other second conductor line except the i-th second conductor line, and otherwise the touch display control subsystem 520 provides the touch driving signal to the i-th second conductor line. As shown in FIG. 10, the touch display control subsystem 520 non-sequentially provides the touch driving signal to the i-th second conductor line.

Figure 11:
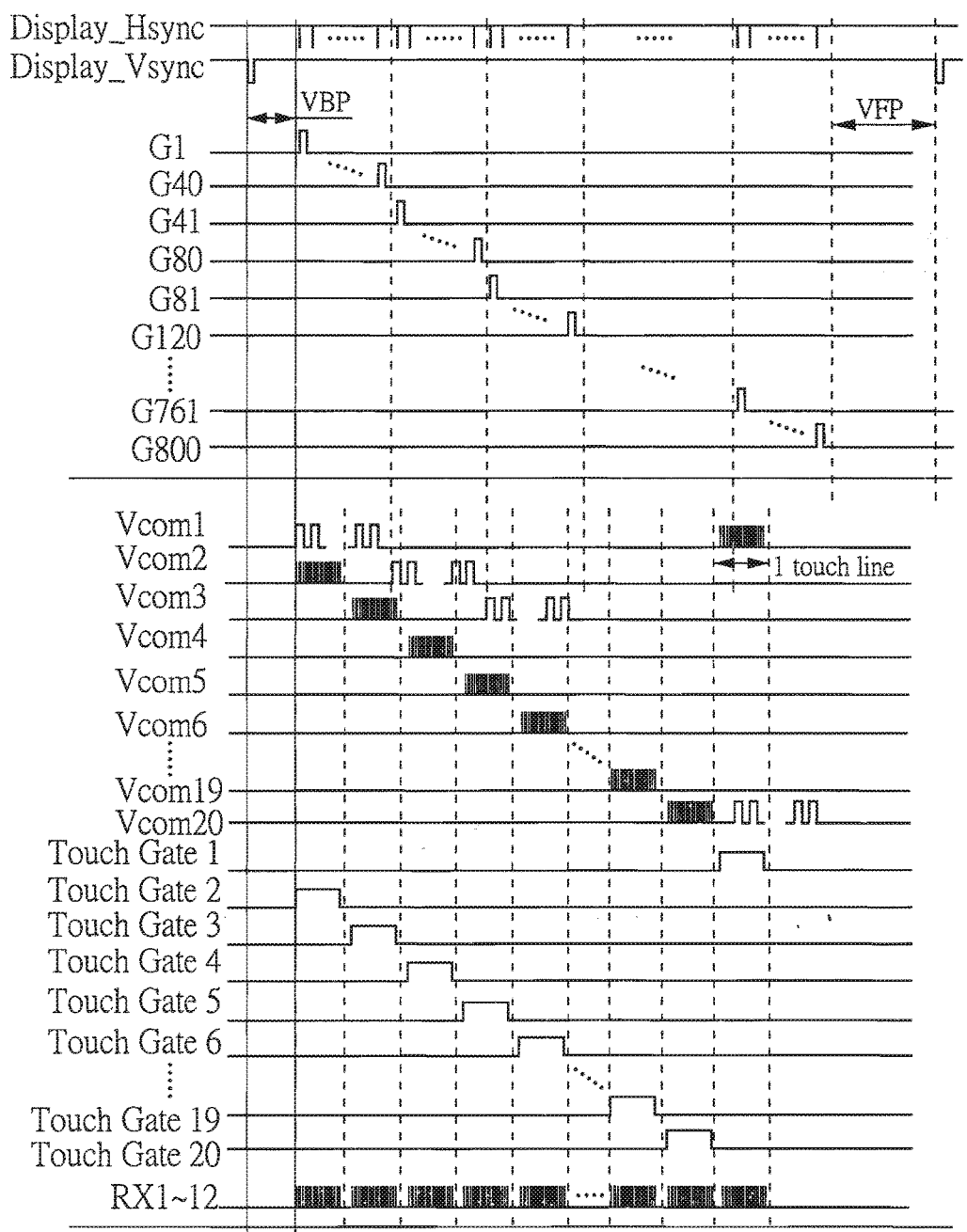
FIG. 11 is a timing of yet another embodiment of the touch display control subsystem in display and touch detection according to the invention.

FIG. 11 is a timing of yet another embodiment of the touch display control subsystem 520 in display and touch detection according to the invention, which is similar to that of FIG. 9 except that the common voltage generator 725 generates AC common voltage (AC-Vcom). That is, when the touch display control subsystem 520 sequentially provides the display driving signal to the first set of gate driving lines G1 to G40, the common voltage generator 725 generates and provides AC common voltage (AC-Vcom) to the corresponding second conductor line Vcom1 at the same time. Thus, on the second conductor line Vcom1, there is AC common voltage (AC-Vcom) but not the touch driving signal. At this moment, the touch display control subsystem 520 provides the touch driving signal to the second conductor line Vcom2.

Figure 12:
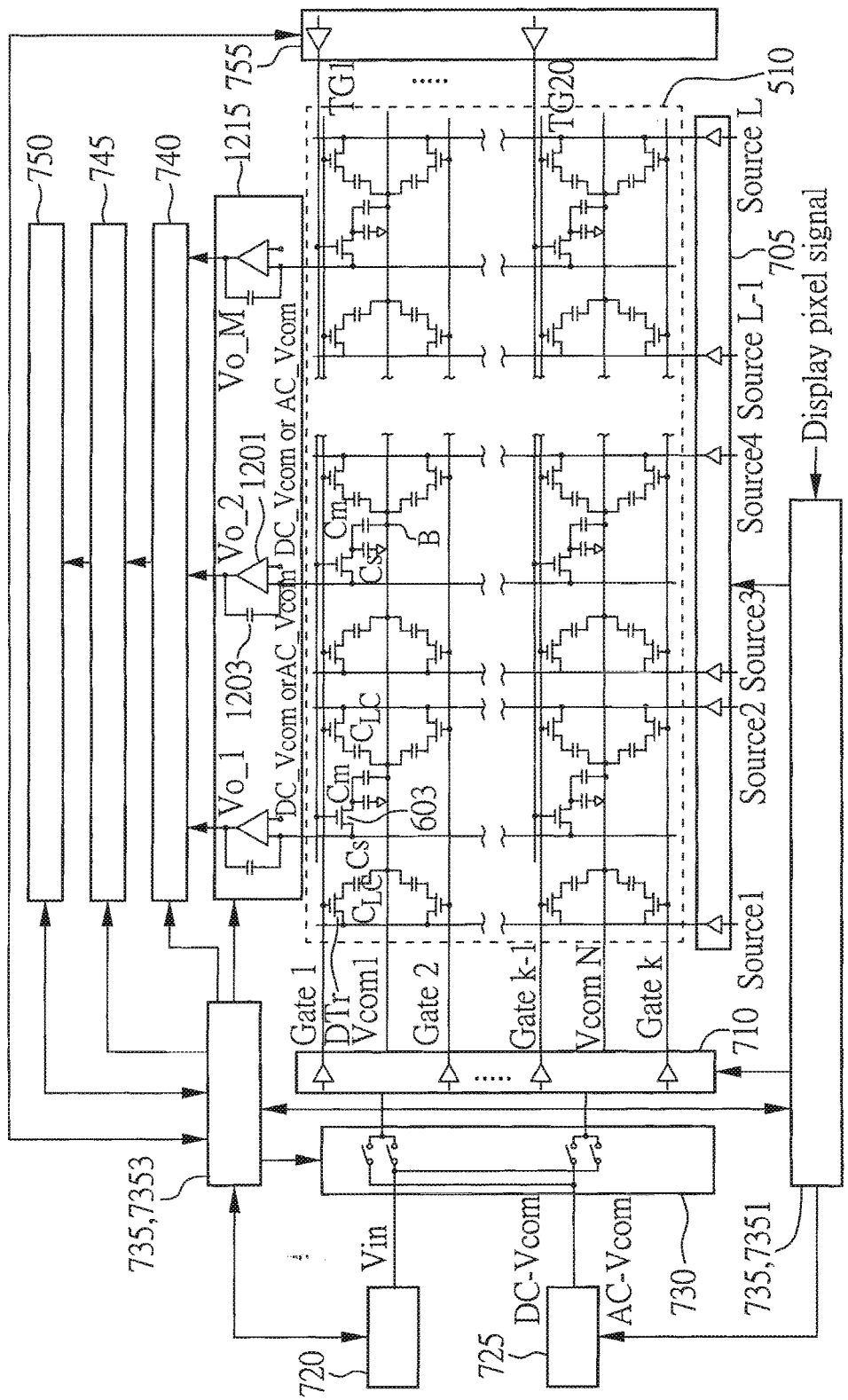
FIG. 12 is a circuit schematic of the in-cell multi-touch display panel system according to another embodiment of the invention.

FIG. 12 is a circuit schematic of the in-cell multi-touch display panel system 500 according to another embodiment of the invention, which is similar to that of FIG. 7 except for the detection device. The detection device 1215 in FIG. 12 has M detection circuits, including an operational amplifier 1201 and a feedback capacitor 1203 respectively. The feedback capacitor 1203 has one end connected to the inverting input end of the operational amplifier 1201 and the other end connected to the output end of the operational amplifier 1201. The inverting input end of the operational amplifier 1201 is connected to one of the M first conductor lines. The non-inverting input end of the operational amplifier 1201 is connected to the common voltage (Vcom).

The circuit of FIG. 12 is provided to detect the mutual capacitance Cm between the M first conductor lines (RX1, RX2, ..., RX12) and the N second conductor lines (Vcom1, Vcom2, ..., Vcom20) for use as a standard to determine a touch, wherein the circuit of FIG. 12 is different from the circuit of FIG. 7 for detecting self capacitance (Cs) with respect to ground. The circuit for detecting the mutual capacitance Cm makes use of charge integrators and thus does not provide the touch driving signal VIN to the M first conductor lines (RX1, RX2, . . . , RX12), while the voltages of the M first conductor lines (RX1, RX2, . . . , RX12) are kept to be constant.

Figure 13:
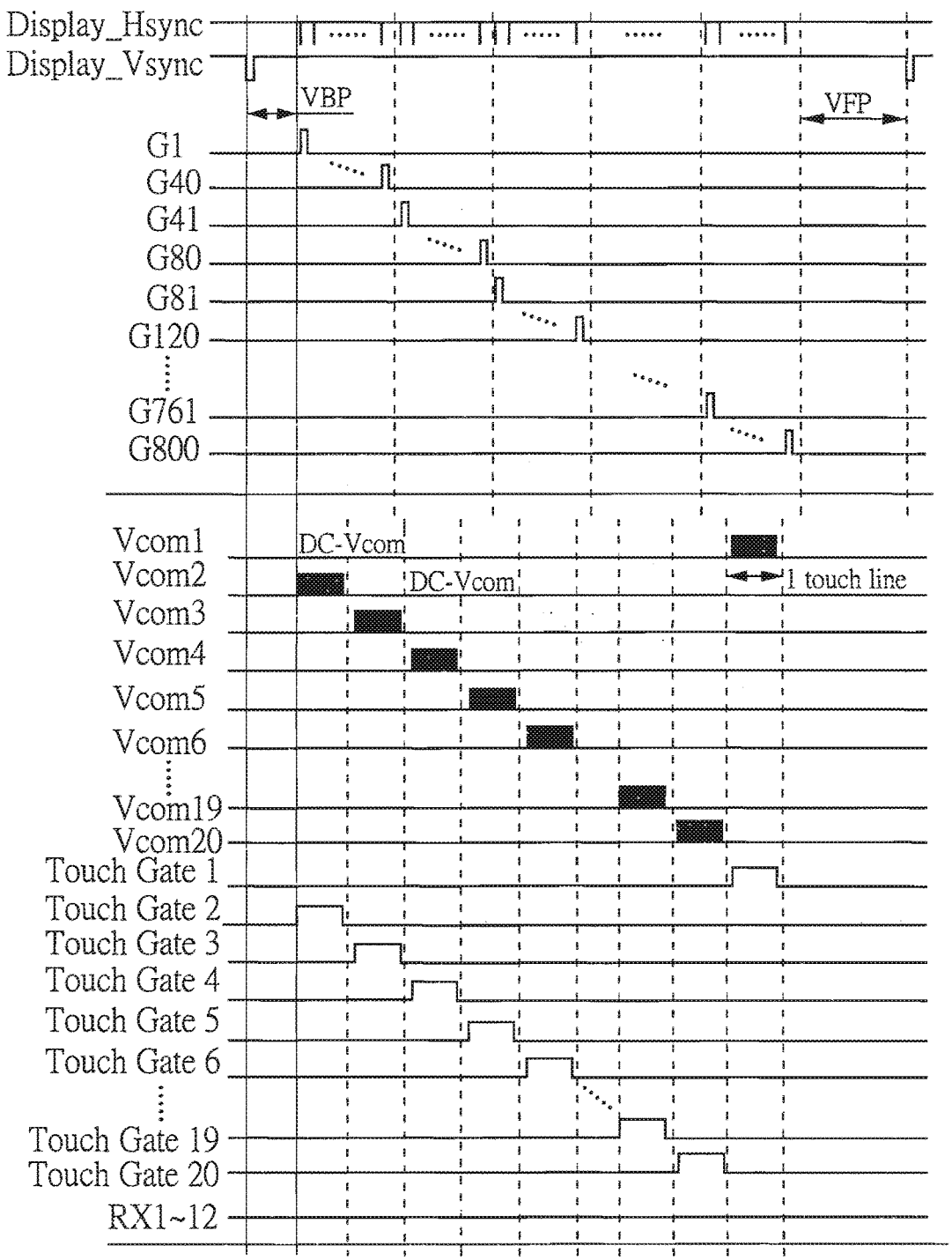
FIG. 13 is a timing of further another embodiment of the touch display control subsystem in display and touch detection according to the invention.

FIG. 13 is a timing of further another embodiment of the touch display control subsystem 520 in display and touch detection according to the invention, which is provided to proceed with a mutual capacitance detection, wherein the voltages of the M first conductor lines are kept to be constant.

In view of the foregoing, it is known that, in addition to integrating the touch sensing circuits into a typical LCD panel, the invention can share the common voltage signal and touch driving layer by the common voltage layer of the LCD panel and the drivers of the touch sensor thereby saving the cost. The prior art uses a time sharing for display and touch detection, rather than sharing the same layer of transparent conductors by the common voltage layer of the LCD panel and the drivers of the touch sensor. Further, the invention uses different timing to drive a display on the LCD panel and perform a touch detection at the same time, which can overcome the problem of insufficient time for driving the display and the touch detection in time sharing.

Furthermore, when the touch display control subsystem 520 provides the touch driving signal to the i-th second conductor line and the M first conductor lines (RX1, RX2, . . . , RX12), it only turns on the i-th set of touch-control transistors corresponding to the i-th second conductor line. Thus, the touch driving signal on the 2-nd second conductor line Vcom2 detected by the other sets of detection electrode areas 601 will not be reflected to M first conductor lines (RX1, RX2, . . . , RX12), thereby increasing the accuracy in touch detection.

Accordingly, it is clear from the above description that the invention has the advantages as follows:

1. The same layer of transparent conductors can be shared by the common voltage layer of the LCD panel and the drivers of the touch detection, thereby the cost will be saved. In addition, active devices are used for control so as to turn on the capacitors only in the range of detection thereby reducing the parasitic capacitance on the first conductor line and increasing the sensitivity of detection.

2. When the LCD panel is driven, in addition to the second conductor lines corresponding to the gate driving lines (G1, G2, . . . , GK) in display, at least one of the other second conductor lines can be driven in touch detection at the same time. Namely, the display on the LCD panel and the touch detection in the invention can be performed concurrently with the respective signals (DC-Vcom, AC-Vcom, VIN) outputted to the different second conductor lines (Vcom1, Vcom2, . . . , VcomN), so that there is no need to wait between the panel display and the touch detection.

3. The timing of the gate driving lines (G1, G2, . . . , GK) and source driving lines (SOURCE1, SOURCE2, . . . , SOURCEL) on the LCD panel can maintain in touch detection without a change, and the second conductor lines (Vcom1, Vcom2, . . . , VcomN) on the updating area or areas of the LCD panel can be avoided by using the touch clock controller to read the signals (such as Vsync/Hsync) associated with the LCD panel in operation.

4. It allows the touch signal to automatically avoid the second conductor lines (Vcom1, Vcom2, . . . , VcomN) corresponding to the gate driving lines (G1, G2, . . . , GK) in display, thereby preventing the common voltage signal (Vcom) and the touch driving signal from being concurrently provided to the same second conductor line (Vcom1, Vcom2, . . . , VcomN). Therefore, the display timing of the LCD panel is not required to be changed. Namely, the touch detection is not necessary to be synchronous with the display on the LCD panel. To implement an asynchronous configuration with a frequency of 60 Hz for the display on the LCD panel and a frequency of 100 Hz for the touch detection can be easily.

Although the present invention has been explained in relation to its preferred embodiment, it is to be understood that many other possible modifications and variations can be made without departing from the spirit and scope of the invention as hereinafter claimed.

What is claimed is:

1. An in-cell multi-touch display panel system, comprising:
   a touch liquid crystal display panel including:
      a thin film transistor layer having K gate driving lines, L source driving lines, and a plurality of thin film transistors, where K and L are each a positive integer;
      a touch-sensing structure comprising:
      a detection electrode layer having a plurality of touch-control transistors, M first conductor lines and a plurality of auxiliary detection electrode areas, wherein the M first conductor lines and the auxiliary detection electrode areas are independently or dependently used for touch detection, where M is a positive integer; and
      a common-voltage and touch-driving layer having N second conductor lines for receiving a common voltage signal in display operation and receiving a touch driving signal in touch detection, where N is a positive integer and K >N, wherein the auxiliary detection electrode areas are respectively configured at intersections of the first conductor lines and the second conductor lines in the detection electrode layer, each first conductor line is connected to N auxiliary detection electrode areas via N touch-control transistors, and the M×N touch-control transistors are divided into N sets corresponding to the N second conductor lines, respectively, wherein the detection electrode layer and the common-voltage and touch-driving layer are on the same side of the thin film transistor layer, and the N second conduct lines are intersected with the M first conduct lines; and
   a touch display control subsystem, connected to the thin film transistor layer, the detection electrode layer, and the common-voltage and touch-driving layer, for providing display driving signal sequentially to the K gate driving lines and turning on the corresponding thin film transistors, providing display pixel signal to the L source driving lines for performing display operation, and providing the touch driving signal to the N second conductor lines and sampling detection voltages from the M first conductor lines to detect whether there is an external object approached;
   wherein the K gate driving lines are divided into N sets corresponding to the N second conductor lines respectively, and when one set of gate driving lines has the display driving signal, the second conductor line corresponding to the set of gate driving lines is connected to the common voltage, and wherein the touch display control subsystem does not provide the touch driving signal to the i-th second conductor line when the display driving signal is provided to one set of gate driving lines corresponding to the i-th second conductor line, where i is an positive integer and 2≤i≤N, provides the touch driving signal to the i-th second conductor line and M first conductor lines and turns on the i-th set of touch-control transistors corresponding to the i-th second conductor line in a display period when the display driving signal is not provided to one set of gate driving lines corresponding to the i-th second conductor line, and provides the touch driving signal to the (i-1)-th second conductor line and the display driving signal to the i-th set of gate driving lines corresponding to the i-th second conductor line at the same time for simultaneously performing display operation and touch detection.

2. The in-cell multi-touch display panel system as claimed in claim 1, wherein when the touch display control subsystem provides the display driving signal to the first set of gate driving lines, the touch display control subsystem provides the common voltage to the N second conductor lines.

3. The in-cell multi-touch display panel system as claimed in claim 2, wherein after the touch display control subsystem provides the display driving signal to the N-th set of gate driving lines, the touch display control subsystem provides the touch driving signal to the N-th second conductor line and M first conductor lines for turning on the N-th set of touch-control transistors corresponding to the N-th second conductor line.

4. The in-cell multi-touch display panel system as claimed in claim 1, wherein the M first conductor lines and the L source driving lines are arranged in a first direction, and the K gate driving lines and the N second conductor lines are arranged in a second direction.

5. The in-cell multi-touch display panel system as claimed in claim 4, wherein the first direction and the second direction are vertical mutually.

6. The in-cell multi-touch display panel system as claimed in claim 5, wherein the touch display control subsystem comprises:
- a source driver connected to the touch liquid crystal display panel for driving the touch liquid crystal display panel based on the display pixel signal;
- a gate driver connected to the touch liquid crystal display panel for generating the display driving signal to drive the touch liquid crystal display panel;
- a detection device connected to the touch liquid crystal display panel for detecting signals of the touch liquid crystal display panel;
- a touch driving signal generator for generating the touch driving signal;
- a common voltage generator for generating the common voltage;
- a switch, connected to the touch liquid crystal display panel, the touch driving signal generator, and the common voltage generator;
- a touch-control transistor gate driver connected to the touch liquid crystal display panel for generating gate driving signals for the N sets of touch-control transistors so as to drive the N sets of touch-control transistors to be turned on or off; and
- a control device connected to the source driver, the gate driver, the common voltage generator, the detection device, the touch driving signal generator, the switch, and the touch-control transistor gate driver for configuring the switch to provide the touch driving signal or the common voltage to the N second conductor lines and provide the touch driving signal to the M first conductor lines, configuring the gate driver to sequentially output the display driving signal to the K gate driving lines, configuring the source driver to output the display pixel signal to the L source driving lines, and configuring the N sets of touch-control transistors to be turned on or off.

7. The in-cell multi-touch display panel system as claimed in claim 6, wherein the control device further comprises:
- a display timing controller connected to the source driver, the gate driver, and the common voltage generator for providing a timing of the display pixel signal and the display driving signal by the source driver and the gate driver, and a timing of the common voltage by the common voltage generator; and
- a touch timing controller connected to the display timing controller, the detection device, the touch driving signal generator, the switch, and the touch-control transistor gate driver for configuring the switch to provide the touch driving signal or the common voltage to the N second conductor lines and provide the touch driving signal to the M first conductor lines, and configuring the N sets of touch-control transistors to be turned on or off.

8. The in-cell multi-touch display panel system as claimed in claim 4, wherein the M first conductor lines and the N second conductor lines have parasitic capacitance and stray capacitance, and a mutual capacitance is formed in an overlap between the M first conductor lines and each of the N second conductor lines.

9. The in-cell multi-touch display panel system as claimed in claim 8, wherein the detection device comprises M detection circuits for detecting the mutual capacitance to generate corresponding M detection signals.

10. The in-cell multi-touch display panel system as claimed in claim 4, wherein the touch display control subsystem further comprises:
- a set of programmable gain amplifiers connected to the detection device for amplifying the M detection signals to generate M amplified detection signals;
- a set of analog-to-digital converters connected to the set of programmable gain amplifiers for converting the M amplified detection signals into M digital detection signals; and
- a coordinate determination device connected to the set of analog-to-digital converters for determining a coordinate of the external object based on the M digital detection signals.

11. The in-cell multi-touch display panel system as claimed in claim 10, wherein the M detection circuits consists of an amplifier and a capacitor respectively, the capacitor has one end connected to an inverting input end of the amplifier and the other end connected to an output end of the amplifier, the inverting input end of the amplifier is connected to one of the M first conductor lines.

12. An in-cell multi-touch display panel system, comprising:
- a touch liquid crystal display panel including:
  - a thin film transistor layer having K gate driving lines, L source driving lines, and a plurality of thin film transistors, where K and L are each a positive integer;
  - a touch-sensing structure, comprising:
    - a detection electrode layer having a plurality of touch-control transistors, M first conductor lines and a plurality of auxiliary detection electrode areas, wherein the M first conductor lines and the auxiliary detection electrode areas are independently or dependently used for touch detection, where M is a positive integer; and
    - a common-voltage and touch-driving layer having N second conductor lines for receiving a common voltage signal in display operation and receiving a touch driving signal in touch detection, where N is a positive integer and K >N, wherein the auxiliary detection electrode areas are respectively configured at intersections of the first conductor lines and the second conductor lines in the detection electrode layer, each first conductor line is connected to N auxiliary detection electrode areas via N touch-control transistors, and the M×N touch-control transistors are divided into N sets corresponding to the N second conductor lines, respectively, wherein the detection electrode layer and the common-voltage and touch-driving layer are on the same side of the thin film transistor layer, and the N second conduct lines are intersected with the M first conduct lines; and a touch display control subsystem connected to the thin film transistor layer, the detection electrode layer, and the common-voltage and touch-driving layer for providing display driving signal sequentially to the K gate driving lines and turning on the corresponding thin film transistors, providing display pixel signal to the L source driving lines for performing display operation, and providing the touch driving signal to the N second conductor lines and sampling detection voltages from the M first conductor lines to detect whether there is an external object approached;

wherein touch display control subsystem comprises:

a touch driving signal generator for generating the touch driving signal;

a common-voltage generator for generating the common voltage signal;

a switch connected to the touch liquid crystal display panel, the touch driving signal generator, and the common voltage generator; and a control device connected to the touch driving signal generator, the common voltage generator, and the switch for configuring the switch to provide the touch driving signal or the common voltage signal to the N second conductor lines;

wherein the K gate driving lines are divided into N sets corresponding to the N second conductor lines respectively, and when one set of gate driving lines has the display driving signal, the second conductor line corresponding to the set of gate driving lines is connected to the common voltage, and wherein the touch display control subsystem does not provide the touch driving signal to the i-th second conductor line when the display driving signal is provided to one set of gate driving lines corresponding to the i-th second conductor line, where i is an positive integer and 2≤i≤N provides the touch driving signal to the i-th second conductor line and M first conductor lines and turns on the i-th set of touch-control transistors corresponding to the i-th second conductor line in a display period when the display driving signal is not provided to one set of gate driving lines corresponding to the i-th second conductor line, and provides the touch driving signal to the (i-1)-th second conductor line and the display driving signal to the i-th set of gate driving lines corresponding to the i-th second conductor line at the same time for simultaneously performing display operation and touch detection.

13. An in-cell multi-touch display panel system, comprising:

a touch liquid crystal display panel including:

a thin film transistor layer having K gate driving lines, L source driving lines, and a plurality of thin film transistors, where K and L are each a positive integer;

a touch-sensing structure, comprising:

a detection electrode layer having a plurality of touch-control transistors, M first conductor lines and a plurality of auxiliary detection electrode areas, wherein the M first conductor lines and the auxiliary detection electrode areas are independently or dependently used for touch detection, where M is a positive integer; and a common-voltage and touch-driving layer having N second conductor lines for receiving a common voltage signal in display operation and receiving a touch driving signal in touch detection, where N is a positive integer and K >N, wherein the auxiliary detection electrode areas are respectively configured at intersections of the first conductor lines and the second conductor lines in the detection electrode layer, each first conductor line is connected to N auxiliary detection electrode areas via N touch-control transistors, and the M×N touch-control transistors are divided into N sets corresponding to the N second conductor lines, respectively, wherein the detection electrode layer and the common-voltage and touch-driving layer are on the same side of the thin film transistor layer, and the N second conduct lines are intersected with the M first conduct lines; and a touch display control subsystem connected to the thin film transistor layer, the detection electrode layer, and the common-voltage and touch-driving layer for providing display driving signal sequentially to the K gate driving lines and turning on the corresponding thin film transistors, providing display pixel signal to the L source driving lines for performing display operation, and providing the touch driving signal to the N second conductor lines and sampling detection voltages from the M first conductor lines to detect whether there is an external object approached;

wherein the K gate driving lines are divided into N sets corresponding to the N second conductor lines respectively, and when one set of gate driving lines has the display driving signal, the second conductor line corresponding to the set of gate driving lines is connected to the common voltage, and wherein the touch display control subsystem does not provide the touch driving signal to the i-th second conductor line when the display driving signal is provided to one set of gate driving lines corresponding to the i-th second conductor line, where i is an positive integer and 2≤i≤N provides the touch driving signal to the i-th second conductor line and M first conductor lines and turns on the i-th set of touch-control transistors corresponding to the i-th second conductor line in a display period so that the voltages detected by the auxiliary detection electrode areas corresponding to the i-th set of touch-control transistors are respectively reflected to the M first conductor lines when the display driving signal is not provided to one set of gate driving lines corresponding to the i-th second conductor line.

14. The in-cell multi-touch display panel system as claimed in claim 13, wherein when the touch display control subsystem provides the display driving signal to the first set of gate driving lines, the touch display control subsystem provides the common voltage to the N second conductor lines.

15. The in-cell multi-touch display panel system as claimed in claim 14, wherein after the touch display control subsystem provides the display driving signal to the Nth set of gate driving lines, the touch display control subsystem provides the touch driving signal to the N-th second conductor line and M first conductor lines for turning on the N-th set of touch-control transistors corresponding to the N-th second conductor line.

16. The in-cell multi-touch display panel system as claimed in claim 13, wherein the M first conductor lines and the L source driving lines are arranged in a first direction, and the K gate driving lines and the N second conductor lines are arranged in a second direction.

17. The in-cell multi-touch display panel system as claimed in claim 16, wherein the first direction and the second direction are vertical mutually.

18. The in-cell multi-touch display panel system as claimed in claim 17, wherein the touch display control subsystem comprises:
 a source driver connected to the touch liquid crystal display panel for driving the touch liquid crystal display panel based on the display pixel signal;
 a gate driver connected to the touch liquid crystal display panel for generating the display driving signal to drive the touch liquid crystal display panel;
 a detection device connected to the touch liquid crystal display panel for detecting signals of the touch liquid crystal display panel;
 a touch driving signal generator for generating the touch driving signal;
 a common voltage generator for generating the common voltage;
 a switch connected to the touch liquid crystal display panel, the touch driving signal generator, and the common voltage generator;
 a touch-control transistor gate driver connected to the touch liquid crystal display panel for generating gate driving signals for the N sets of touch-control transistors so as to drive the N sets of touch-control transistors to be turned on or off; and
 a control device connected to the source driver, the gate driver, the common voltage generator, the detection device, the touch driving signal generator, the switch, and the touch-control transistor gate driver for configuring the switch to provide the touch driving signal or the common voltage to the N second conductor lines and provide the touch driving signal to the M first conductor lines, configuring the gate driver to sequentially output the display driving signal to the K gate driving lines, configuring the source driver to output the display pixel signal to the L source driving lines, and configuring the N sets of touch-control transistors to be turned on or off.

19. The in-cell multi-touch display panel system as claimed in claim 18, wherein the control device further comprises:
 a display timing controller connected to the source driver, the gate driver, and the common voltage generator for providing a timing of the display pixel signal and the display driving signal by the source driver and the gate driver, and a timing of the common voltage by the common voltage generator; and
 a touch timing controller connected to the display timing controller, the detection device, the touch driving signal generator, the switch, and the touch-control transistor gate driver for configuring the switch to provide the touch driving signal or the common voltage to the N second conductor lines and provide the touch driving signal to the M first conductor lines, and configuring the N sets of touch-control transistors to be turned on or off.

20. The in-cell multi-touch display panel system as claimed in claim 16, wherein the M first conductor lines and the N second conductor lines have parasitic capacitance and stray capacitance, and a mutual capacitance is formed in an overlap between the M first conductor lines and each of the N second conductor lines.

* * * * *